United States Patent [19]
Hardt

[11] Patent Number: 5,763,850
[45] Date of Patent: Jun. 9, 1998

[54] WELDING PROCESS WITH UPRIGHT NONCOAXIAL ORBITAL TRANSVERSE MOTION CONTACT WITH ELECTRIC RESISTANCE HEATING

[76] Inventor: Robert C. Hardt, 17700 Cedar Ave., Country Club Hills, Ill. 60478

[21] Appl. No.: 563,950

[22] Filed: Nov. 29, 1995

[51] Int. Cl.⁶ .................................................. B23K 11/02
[52] U.S. Cl. ............................................. 219/104; 219/55
[58] Field of Search ............................... 219/55, 101, 102, 219/104

[56] References Cited

U.S. PATENT DOCUMENTS

| | | | |
|---|---|---|---|
| 2,193,490 | 3/1940 | Rehse | 219/101 |
| 3,472,996 | 10/1969 | Braid et al. | 219/104 |

*Primary Examiner*—Clifford C. Shaw
*Attorney, Agent, or Firm*—Potthast & Ring

[57] ABSTRACT

An improved welding process in which two metallic pieces are each composed of weld compatible parent metal, one metallic piece has one surface and the other metallic piece has another surface each having prominences positioned thereon and an oxide of parent metal disposed on the overlying surfaces and prominences including the steps of applying a force along longitudinal axis of metallic pieces to position the prominences to abut; applying a force transverse to the longitudinal axis of one metallic piece providing relative movement in first and second directions transverse to the longitudinal axes, causing displacement to the cross sections of the metallic pieces, moving one surface transverse relative to other surface and the longitudinal axis; and causing an electrical current to pass through metallic pieces elevating temperatures with electric resistance heating for thermal-fusion welding by the relative movement. Another welding process with parent metals of metallic pieces incompatible during heating includes the steps of aligning surfaces to overlie one another; positioning a gap therebetween and positioning surrogate electrically conductive piece in gap; applying force along a longitudinal axis of each metallic piece, applying a force to either the surrogate or metallic piece transverse to the longitudinal axes causing displacement of the surrogate; applying current through metallic pieces and surrogate providing electrical resistance heating; cease applying force to surrogate piece leaving a film; encapsulating surfaces with an inert gas; and removing of surrogate piece and thermal-fusion force welding the two metallic pieces together.

82 Claims, 21 Drawing Sheets

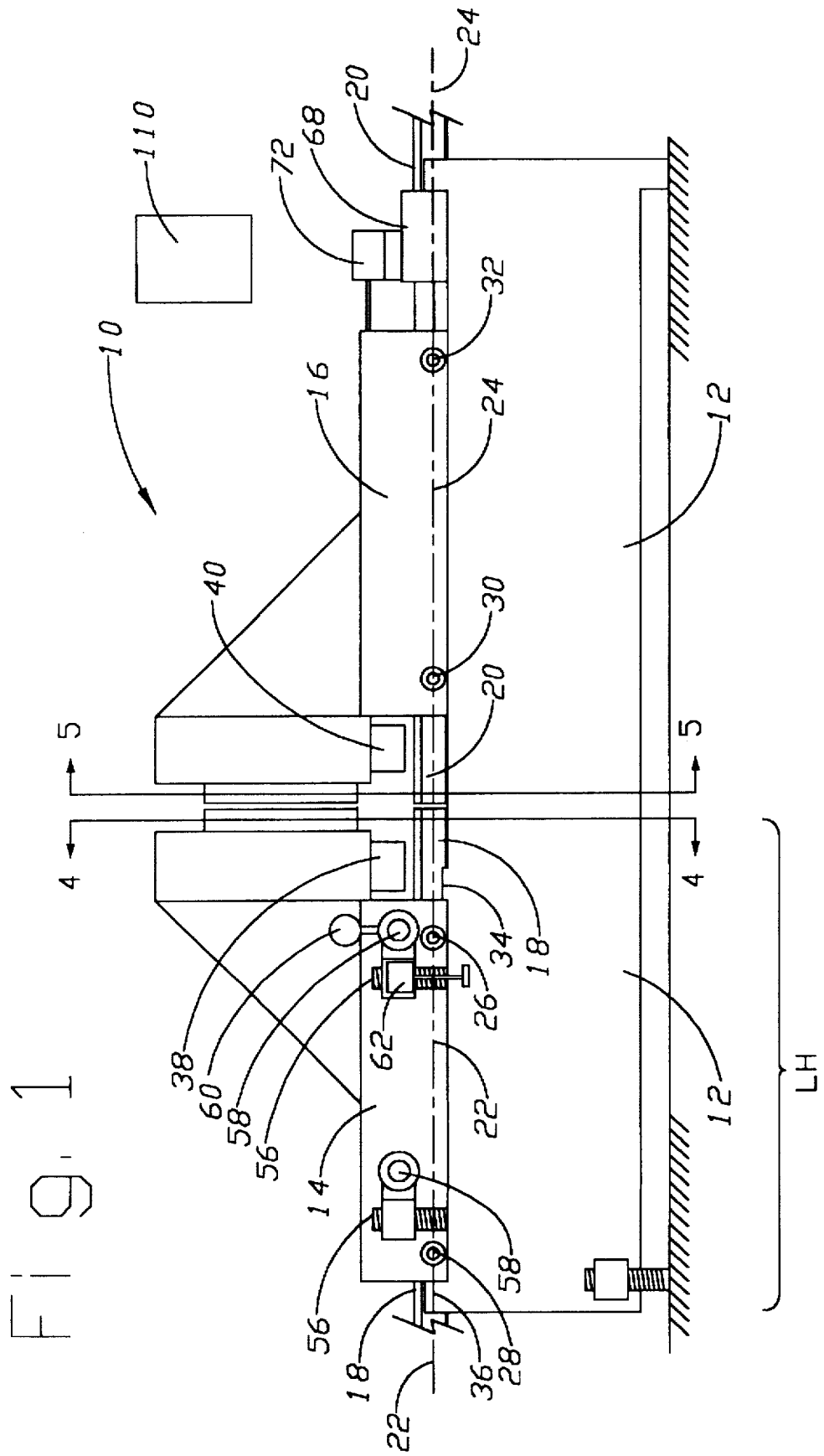

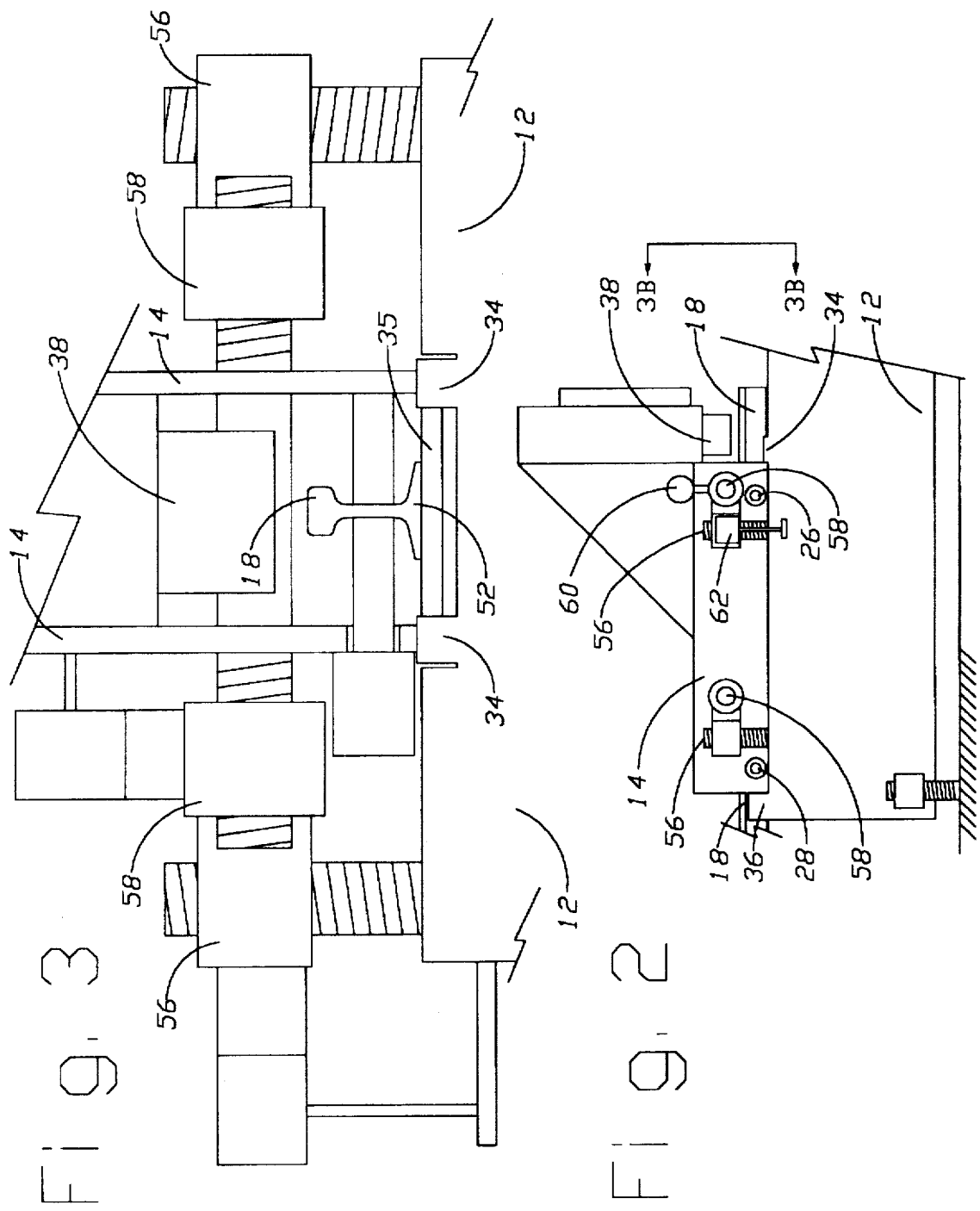

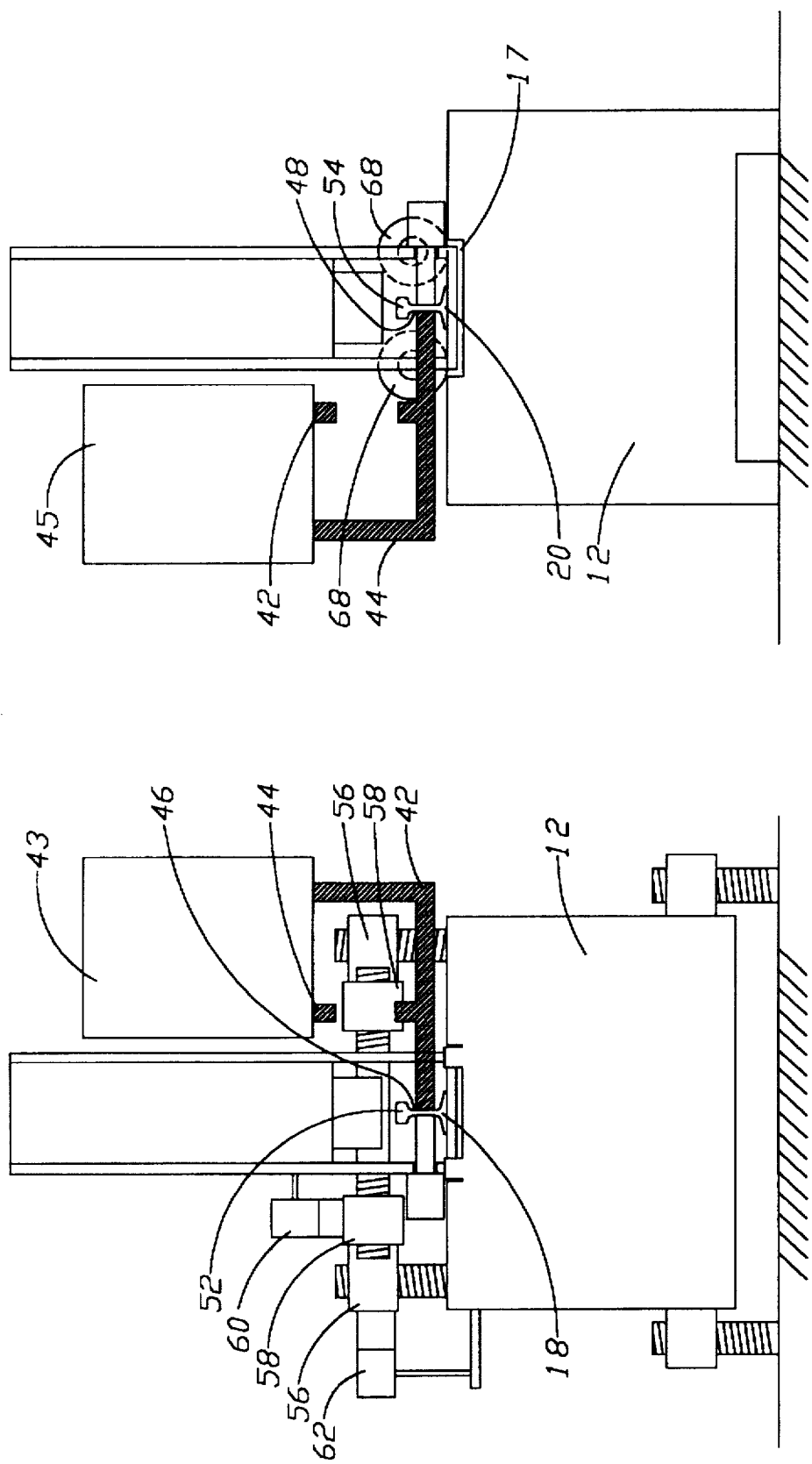

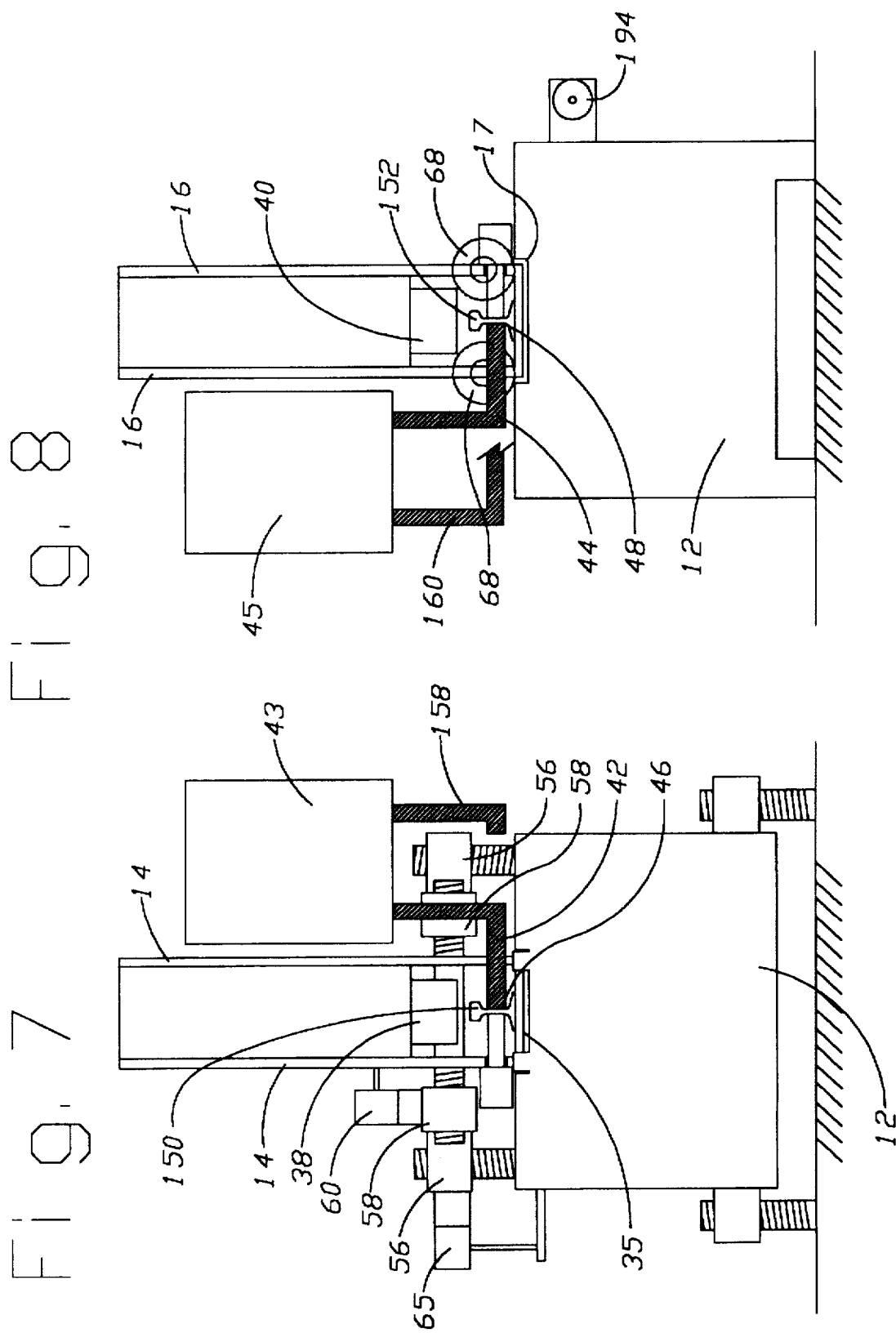

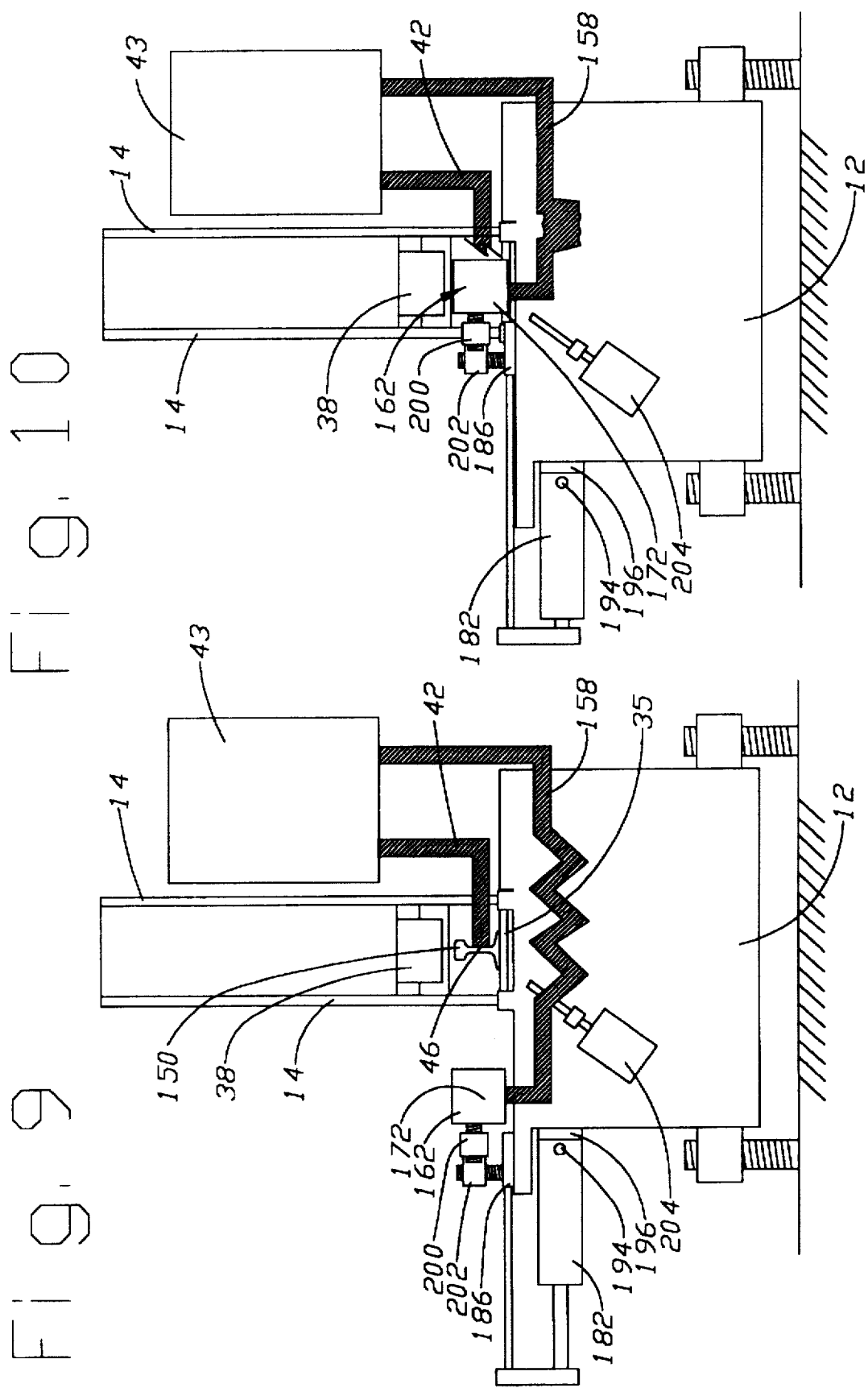

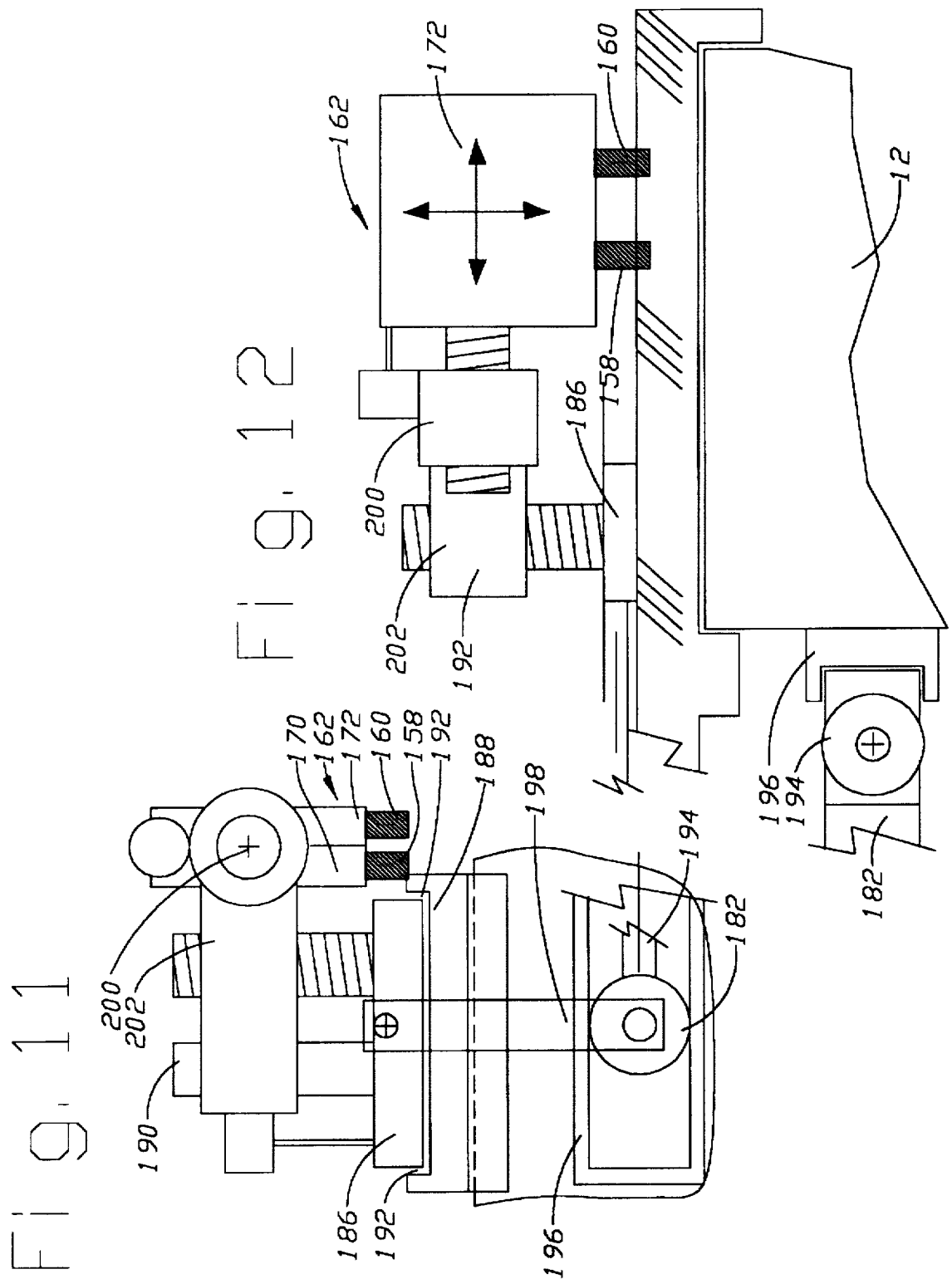

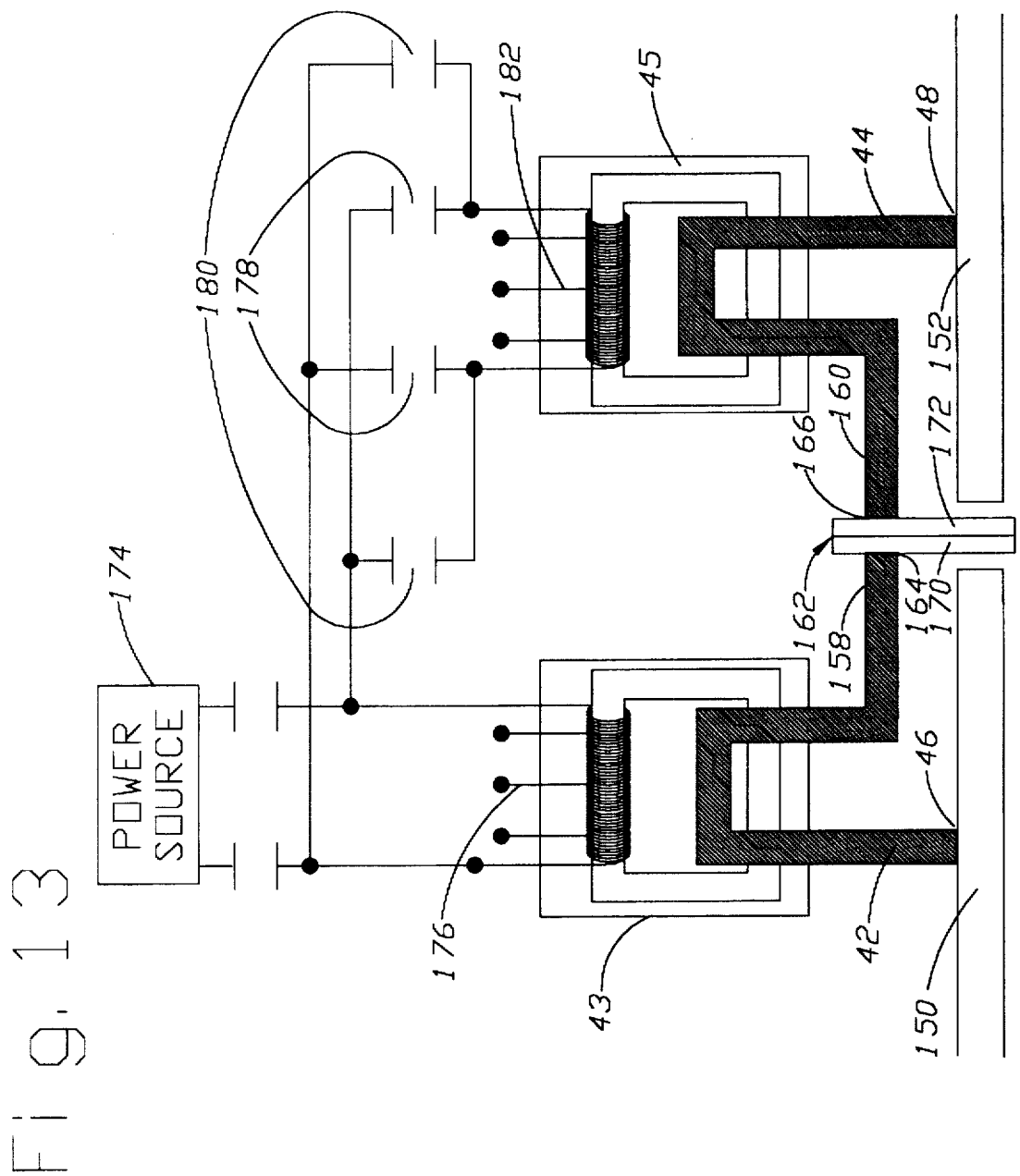

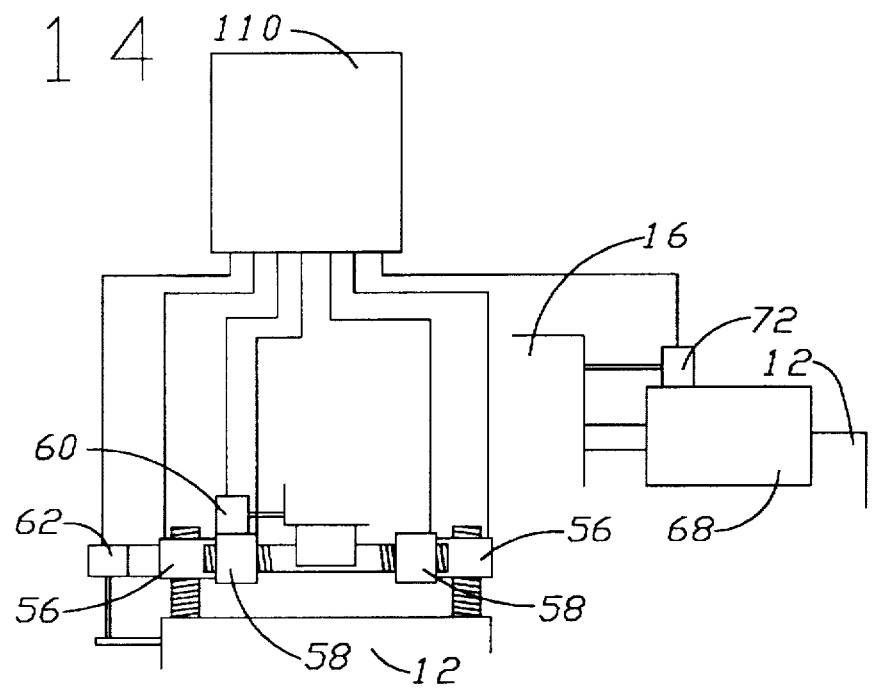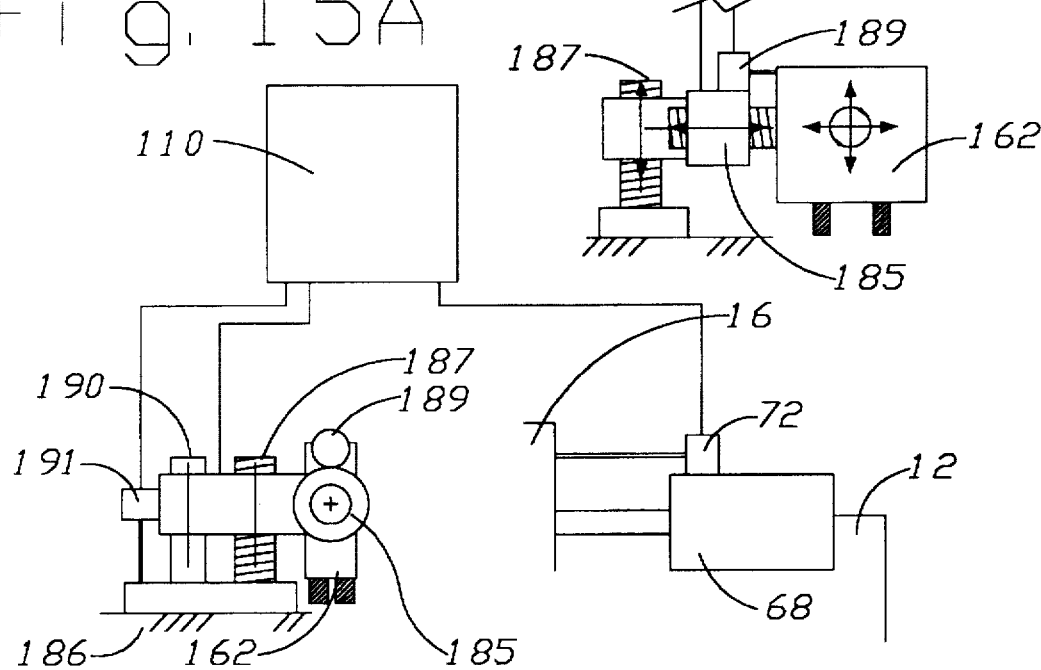

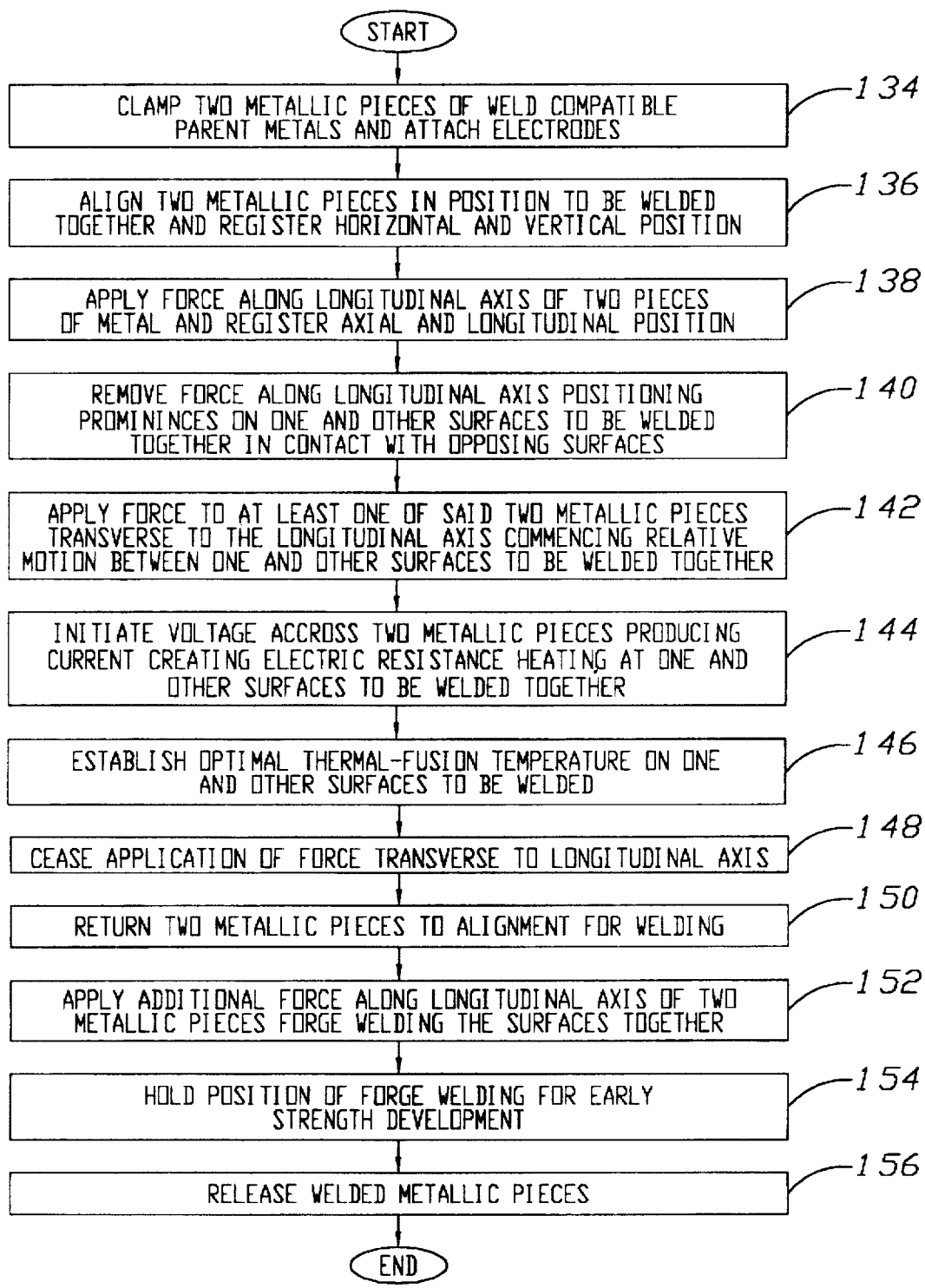

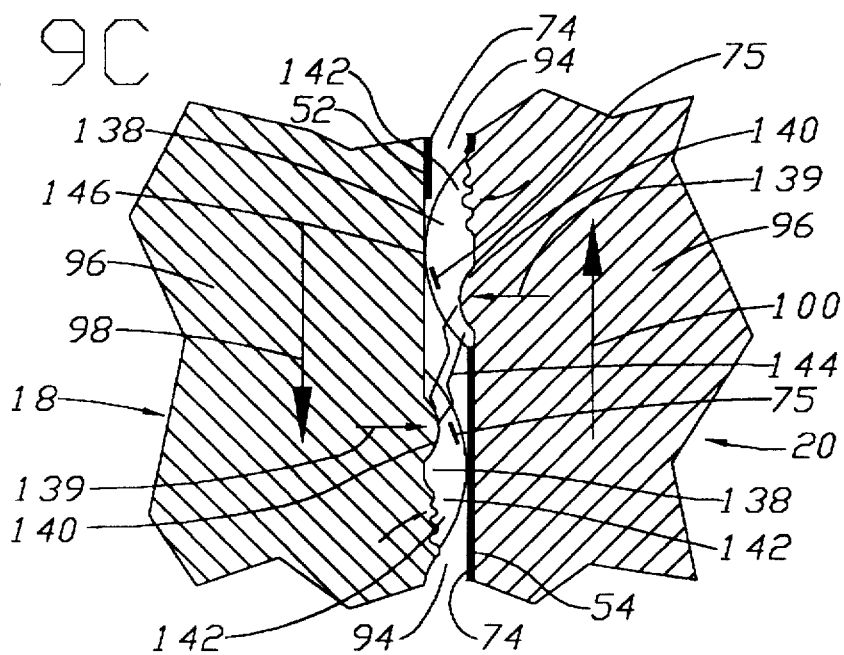
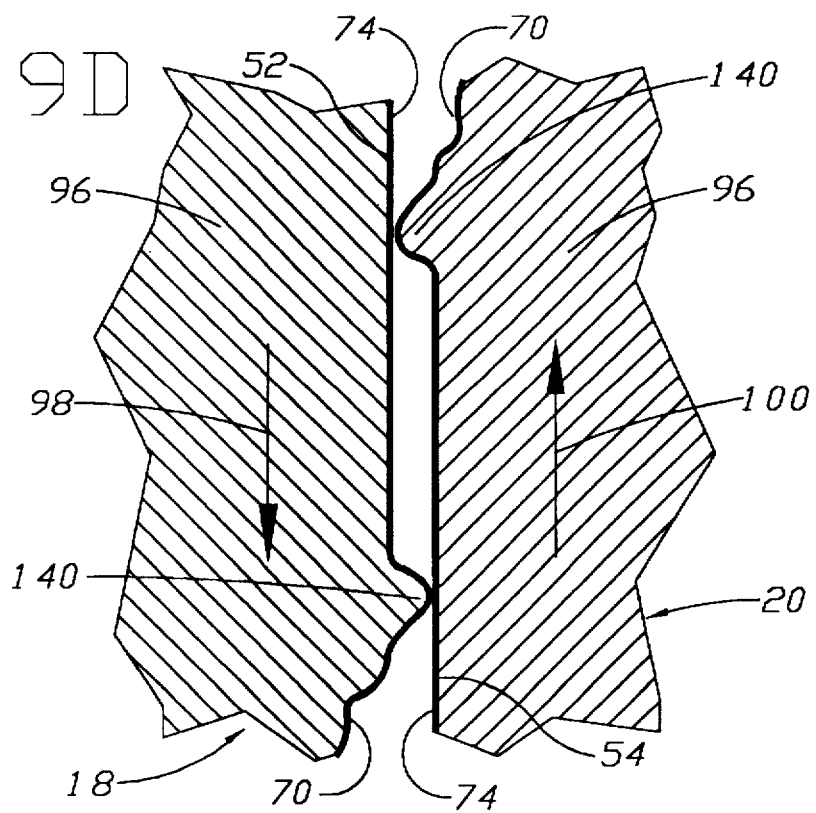

WELDING PROCESS WITH UPRIGHT NONCOAXIAL ORBITAL TRANSVERSE MOTION CONTACT WITH ELECTRIC RESISTANCE HEATING

BACKGROUND OF THE INVENTION

1. Field of the Invention

The present invention relates to thermal-fusion welding of metallic pieces together and more particularly to thermal-fusion welding in which relative movement is imparted between the metallic pieces to be welded together and utilization of electric current being passed through the metallic bodies.

2. Description of the Prior Art

There are numerous well known thermal-fusion welding processes for welding metallic pieces together that have been utilized over the years. Some of these processes include flame heated welding, electric resistance welding, spin friction welding, upright friction orbit welding and flash butt welding.

With regard to flame heated welding, this process typically entails the utilization of multiple flame jets burning spaced apart from and across the surfaces of the metallic pieces to be welded together. The fuel burned is acetylene and often provides carburization or oxidation of the surfaces to be welded together. This carburization is a deposit of molecular free carbon which in turn leads to formation of an undesirable coating and oxidation leads to formation of undesirable scale on the surfaces to be welded together which will weaken the weld when formed. Furthermore, the flame jets are difficult to adjust to provide even heating across the surfaces to be welded together resulting overheating of the surfaces to be welded leaving relatively cold areas on those surfaces. These cold areas are strong enough to frustrate upset forging which is intended to eject the impurities on the surfaces to be welded. Additionally, the frustration of upset forging further produces undesirable gaps or "hot shorts". Moreover, cold areas at upset forging also cause nonuniform thermal expansion of the parent metal surrounding the cold area producing undesirable internal residual stresses within the weld after cooling contractions.

With regard to electric resistance welding, similar problems arise as in the flame heated welding. The electric current passing through the surfaces provides resistance heating. Air filled gaps existing between unmatched surfaces provides oxygen which will begin to decarburize the parent metal producing an undesirable alloy within the weld. The heating of the surfaces will become uneven based on the varying electrical current resistance of the multitude of current paths across the surfaces to be welded. As a result, relatively cold areas will promote undesirable frustration of upset forging inhibiting ejection of impurities from the weld, promote "hot shorts" and enable martinsitic quenching of parent metal and nonuniform cooled contraction surrounding the colder areas imparting residual stresses within the weld.

With regard to spin friction welding, is that it is most appropriate for welding an axially shorter moving part to a longer fixed piece and round cross-sectional parts that are hollow at the rotational axis. However, the process cannot provide constant relative velocity across the surfaces to be welded thereby providing nonuniform frictional heat development along the radius of rotation. Furthermore, the process requires a long time period to obtain the desired rotational velocity of the piece to be welded and necessitates a noncontinuous process when welding multiple consecutive pieces since the machine imparting the rotation is virtually stopped to reload the next piece. This spin friction welding has been attempted to be augmented with electrical current resistance heating U.S.S.R. Patent No. 688,309 to Klemenko, Gorbulski and Esaeb issued Oct. 8, 1977. The problem was to conduct electrical current into a high velocity rotating body ie. 20,000 revolutions per minute. The electrical contact points for current transfer into the rotating piece provided locations for arc caused degradation and required substantial maintenance and cost.

With regard to upright orbit welding, large axial forces are required to provide sufficient kinetic frictional heat for thermal-fusion forge welding to occur. The smoother and cleaner the surfaces to be welded the larger the axial forces are required, likewise, the more rapid the transaxial motion must be to obtain the summed distance of travel to cause the temperatures needed for the thermal-fusion welding from the available coefficients of friction. The large axial force used to hasten the heating produces transverse yielding of the material being welded and causes material and the process heat within that material to be lost. The welding surfaces high cohesiveness at the process bonding temperature and the rapid transaxial motion make the stoppage of the motion at the desired final alignment of the surfaces difficult to attain for forging.

With regard to flash butt welding, a major problem in this process is that the surfaces to be welded together are moved together and moved apart throughout the process in an attempt to establish continuity and regulate the heating from the electrical current arcing between the surfaces. In application, this process requires a high voltage than that to produce the desired heating rate to drive the current through the opposing oxidized surfaces for localized heating on the surfaces to achieve upset forging temperatures. The heating is prolonged in an attempt to heat the piece in proximity to the surfaces to reduce martinsite producing quenching. Much air and its contained oxygen is admitted and exchanged to the gap between the surfaces with moving the surfaces together and apart thereby decarburizing the metallurgy at the surfaces without oxygen diminishment and introducing oxidized parent metal in the location of the weld. Arc flash heating and pre-forging hot face matching by arcing emit loud process sound, bright arc-light flashes, large volumes of flying molten spatter which contain process heat, great fume release and rapidly varying electromagnetic fields from a measurably wide gap between the arcing surfaces. Pre-upset arcing causes craters in the soft hot surfaces to be welded which must then be forged until the crater content of oxidized parent metal and the oxidized crater bottoms are brought to the line of fusion for distribution and fragmentation by substrata extrusion to and in the joining plane. The intermingling of the substrata parent metal with the oxidized metal results in metallurgical carbon being reduced and in the extreme oxidized parent metal remaining within the forged plane of fusion of the weld. Moreover, the driving voltage must be high to avoid simple welded fusion of touch points between the surfaces to be welded in the early stages of cold face heating. The inductive reactance of the characteristic high welding current circuit requires the voltage to be applied at even a higher level to overcome the reluctance of the current to flow at the first contacting of surface prominences causing undesirable aggressive erosion of the welding surfaces. Thus, the process is intermittently interrupted by separating the overlying contacting surfaces to minimize the localized heating of the process which in turn had produced heated metal volume and gas generation which was large and violent emitting undesirable spatter. Furtherrore, the heating becomes uneven because the machines do not correct current flow paths away from asymmetric paths of least resistance and the hotter portions do not provide enough resistant force at upset to eject the undesirable oxides and the relatively cooler portions provide locations of quenching and imparting cooled contraction warping and internal residual stresses within the weld at the time of upset forging.

SUMMARY OF THE INVENTION

It is therefore an object of this invention to provide an improved welding process in which two metallic pieces each composed of a parent metal which are weld compatible with each other, in which each metallic piece extends along a longitudinal axis of each metallic piece, in which each metallic piece has a surface in which each surface has a plurality of prominences positioned thereon in which each of the surfaces extend transverse to its longitudinal axis and in which each surface has a perimeter, in which at least a portion of one surface is positioned to overlie at least a portion of the other surface and in which one surface and the other surface including the plurality of prominences thereon having an oxide of parent metal disposed thereon, including the steps of applying a force along the longitudinal axis of at least one of the metallic pieces to position the plurality of prominences on the one and other surfaces to abut opposing the other and one surfaces respectively between the at least a portion of the one surface and the at least a portion of the other surface; applying a force to at least one of said two metallic pieces transverse to the longitudinal axis of said at least one of said two metallic pieces to provide a relative movement between said two metallic pieces in at least a first direction and a second direction in which said first and second directions are each transverse to said longitudinal axis of said at least one of said two metallic pieces and causing relative displacement between a cross section of each of said two metallic pieces, in which each cross section of each of said two metallic pieces is transverse to its respective longitudinal axis and relative displacement of said at least a portion of said one surface relative to at least a portion of said other surface and transverse to the longitudinal axes; and applying an electrical voltage across the metallic pieces causing an electrical current to pass through the metallic pieces in which the electrical current passes from the one surface to the other surface elevating the temperatures with electric resistant heating of the one and other surfaces for thermal-fusion welding.

It is another object of this invention to provide an improved thermal-fusion welding process in which the elevation of temperature is substantially uniform across the surfaces to be welded together and in which there is formed substantially perpendicular isothermal planes to the longitudinal axis of the metallic pieces to be welded.

It is another object of this invention to provide an improved thermal-fusion welding process in which heating forms a film between the surfaces to be welded and the relative movement of the surfaces in conjunction with the continued production of film assists the purging of undesirable oxygen from between the surfaces.

It is another object of this invention to diminish and preclude the free entry of air and its contained oxygen from entry to the gaps formed between the surfaces being welded.

It is another object of this invention to provide an improved thermal-fusion welding process in which no dramatic power surges occurring and there is a constant lower power demand.

It is another object of this invention to provide an improved thermal-fusion welding process in which there is no electric arc formed between the surfaces to be welded resulting in no spatter.

It is another object of this invention to provide an improved thermal-fusion welding process in which there is no arc light, noise or fumes.

It is another object of this invention to provide an improved thermal-fusion welding process in which there is limited electric arcing formed between the surfaces to be welded in which the limited arcing occurs substantially in the plane of the surfaces between passing prominences of opposing surfaces which are moving in a direction transverse to the longitudinal axis of the metallic pieces being welded thereby being substantially contained between the abutting surfaces being welded and in turn provides moderate voltage variations and reduced spatter and reduced emission of electromagnetic radiation.

It is another object of this invention to provide an improved thermal-fusion welding process in which there is reduced sound, fumes and light emissions.

It is another object of this invention to provide an improved thermal-fusion welding process in which the surface oxide impurities are substantially removed with the relative motion imparted on at least one of the metallic pieces in which the metallic piece is displaced in a direction transverse to the longitudinal axis of the metallic piece in the presence of melted parent metal purging a volume of film containing melted parent metal and the oxide impurities.

It is another object of the present invention to provide animproved welding process in which two metallic pieces each composed of a different parent metal which are incompatible during heating, in which each metallic piece extends along a longitudinal axis of each metallic piece, in which one metallic piece has a one surface extending transverse to its longitudinal axis and the other metallic piece has an other surface transverse to its longitudinal axis, in which each surface has a plurality of prominences positioned thereon and in which the one surface and the other surface and the plurality of prominences each has an oxidized parent metal positioned thereon, including the steps of, aligning the one and other surfaces of each metallic piece in an overlying relationship with each other; positioning a gap between the one and other surfaces of the two metallic pieces and positioning at least one surrogate electrically conductive piece in the gap; applying a force along the longitudinal axis of each of the two metallic pieces to provide a compressive force between the prominences of the one and other surfaces with the at least one surrogate electrically conductive piece positioned between the one and other surfaces and in contact with the prominences of the one and other surfaces; applying a force to at least one of the at least one surrogate electrically conductive piece and the two metallic pieces transverse to the longitudinal axes of the metallic pieces to provide upright relative movement between the at least one surrogate electrically conductive piece and the one and other surfaces causing displacement of the at least one surrogate electrically conductive piece relative to the one and other surfaces and in at least a first and second directions in which each of the directions being transverse to the longitudinal axes creating frictional ablation removing the oxidized parent metal disposed on the prominences positioned on the one and other surfaces providing metallic contact between the prominences positioned on the one and other surfaces and the at least one surrogate electrically conductive piece; applying an electrical current through the two metallic pieces and the at least one surrogate electrically conductive piece, in which electrical resistance heating is created at the one surface and the other surface with the prominences in the metallic contact at multiple locations with said at least one surrogate electrically conductive piece, in which the electrical current passes through parent metal of the prominences and through the at least one surrogate electrically conductive piece at multiple locations where the ablation has removed the oxide of parent metal from the prominences one and other surfaces exposing the parent metal of the prominences providing relocating the multiple locations through the relative movement providing metallic conductive resistance electrical paths through which metallic electrical resistance conduction and conductive path heating is generated causing the elevation of the temperature of the one and other surfaces relatively higher than that of the parent metal within each of the metallic piece respectively integrally connected to and spaced apart from the one surface and the other surface, providing an increased current resistivity generating heating at the one surface and the other surface melting the parent metal underlying the oxide of parent metal positioned thereon in which the melting continues forming a film of parent metal carrying the oxide of parent metal on the one surface and the other surface respectively being moved about the one and other surface respectively with the relative movement; cease applying the force to the at least one of the at least one surrogate electrically conductive piece and the two metallic pieces transverse to the longitudinal axes of the metallic pieces stopping relative movement between the one surface and the other surface and the at least one the surrogate electrically conductive piece with the film carrying the oxides of parent metal from the one and other surfaces substantially moved to outside a perimeter of each of the one and other surfaces with the relative movement and with displacement from the melting parent metal of the metallic pieces and leaving a film containing substantially parent metal positioned between the one and other surface; encapsulating at least the one surface and other surface of the two metallic pieces with an inert gas; and removing of the at least one surrogate electrically conductive piece from between from the one and other surface and moving and forging the one and other surfaces together thermal-fusion forge welding the two metallic pieces together.

BRIEF DESCRIPTION OF THE DRAWINGS

The foregoing objects and advantageous features of the invention will be explained in greater detail and others will be made apparent from the detailed description of the embodiments of the present invention which are given with reference to the several figures of the drawing, in which:

FIG. 1 is an elevational view of the welding machine utilized in carrying out a first embodiment of a process of the present invention;

FIG. 2 is a partial elevational view of the left-hand portion of the welding machine indicated with bracket designated LH in FIG. 1 and FIG. 6;

FIG. 3 is an enlarged cross section view of 3B—3B in FIG. 2 without the transformer and conductor wiring;

FIG. 4 is a cross section view along line A—A in FIG. 1;

FIG. 5 is a cross section view along line B—B in FIG. 1;

FIG. 7 is a cross section view along line E—E in FIG. 6;

FIG. 8 is a cross section view along line D—D in FIG. 6;

FIG. 9 is a cross section view along line of C—C in FIG. 6 with surrogate interstices in retraction;

FIG. 10 is a cross section view along line C—C in FIG. 6 with surrogate interstices in working position;

FIG. 11 is an enlarged view of orbit motion generator for surrogate interstices encircled as 11, in FIG. 6;

FIG. 12 is the orbit motion generator for surrogate interstices as shown in FIG. 11 rotated 90 degrees;

FIG. 13 is a schematic of the electrical power supply to the another embodiment;

FIG. 14 is a wiring schematic of the position and orbital control system for the first embodiment;

FIG. 15A is a wiring schematic of the position and orbital control system for another embodiment;

FIG. 15B is the schematic of the position and orbital control system with the orbit motion generator rotated 90 degrees from FIG. 15A;

FIG. 17B is another flow chart of the process of the first embodiment;

FIG. 19C is another view in the series of views of prominences, in the process of the first embodiment, of opposing one and other surfaces having collided while moving in a transverse direction and moving apart;

FIG. 19D is another view in a series of views of prominences, in the process of the first embodiment, of opposing one and other surfaces having collided while moving in a transverse direction and newly formed prominences have now formed;

DETAILED DESCRIPTION

Figure 6:
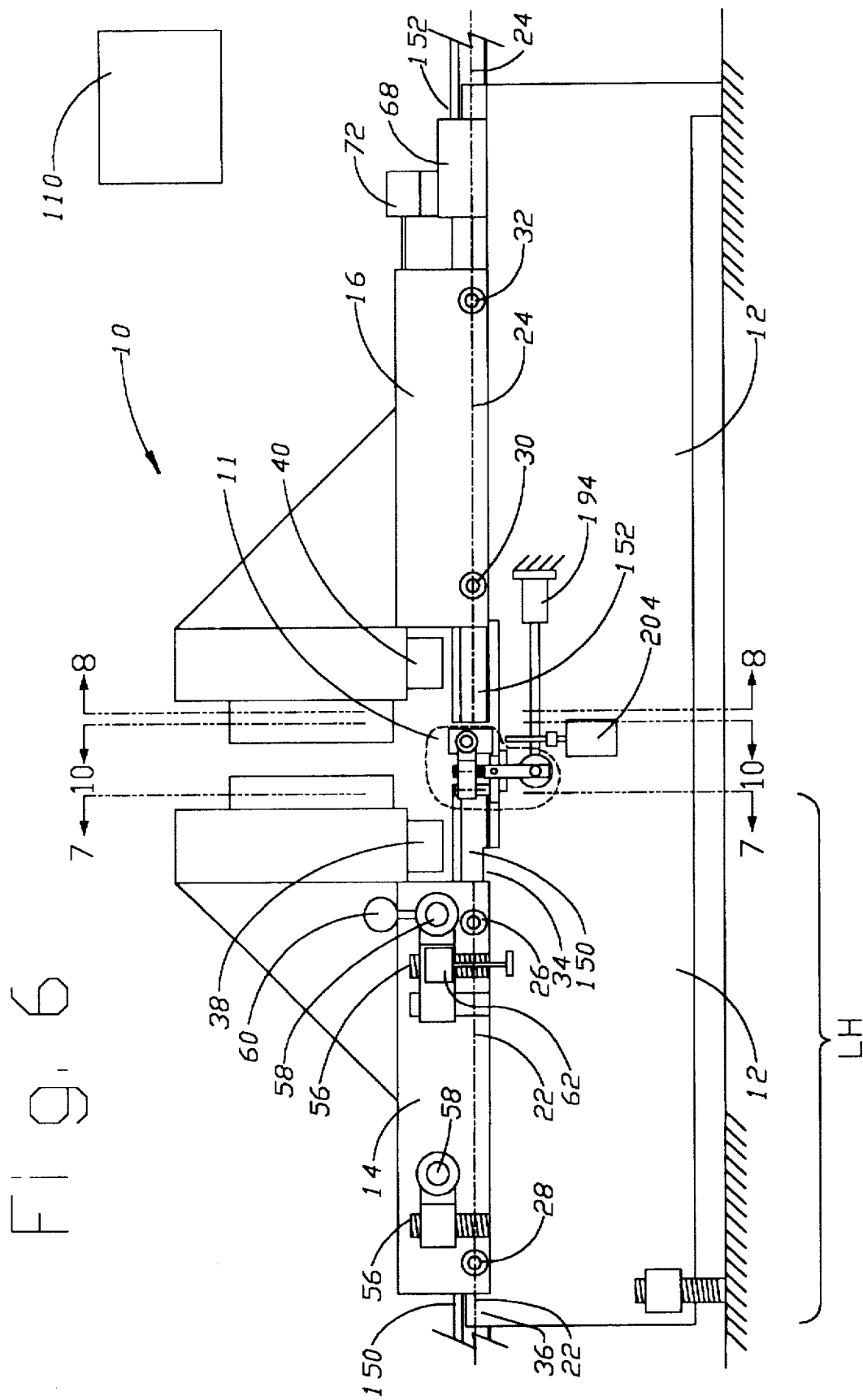
FIG. 6 is an elevational view of the welding machine utilized in carrying out another embodiment of a process of the present invention.

In referring to the figures, an improved welding process will be shown which includes a first embodiment of arcless welding, a second embodiment of limited arcing welding and another embodiment of interstitial welding all of which will be addressed in more detail below.

The machinery utilized in the figures to carry out the arcless, limited arc and interstitial processes is for the most part available with certain variations as will become apparent in the following discussions. The basic machinery without the variations is the AI-MKII rail welder manufactured by A. I. Welders of Inverness, Scotland.

For purposes of the present discussion of the arcless welding process, the process is utilized in welding together two metallic pieces of various sizes and shapes which are constructed of weld compatible parent metals that are the same composition or at least compatible composition having overlapping thermal-fusion temperature ranges. The two metallic pieces each has a longitudinal axis and a surface which extends transverse to the longitudinal axes which are to be welded together. The surfaces have a plurality of prominences positioned on these surfaces to be welded. Furthermore, the surfaces and the prominences have an oxide of parent metal disposed on them. The present discussion will utilize the welding together of two railroad rail sections of high carbon steel as an example in carrying out the process of arcless welding which can be used for many other metals and matching perimeter configurations, as well as for joining of a smaller piece to the flat plane surface of a larger piece.

Referring now to FIG. 1, welding machine 10 has support platform 12 and opposing head portions 14 and 16. Two metallic pieces or rails 18 and 20 are initially placed upon support platform 12 and within the totally surrounding confines of head portions 14 and 16 with longitudinal axis 22 and 24 of each of metallic pieces 18 and 20 respectively, each extending spaced above and along support platform 12 and within the surrounding confines of head portions 14 and 16.

Metallic pieces or rails 18 and 20 are secured within machine 10. First metallic piece 18 is clamped with clamps 26 and 28 into head portion 14 and similarly second metallic piece 20 is clamped into head portion 16 with clamps 30 and 32. Head portion 14 is restricted from movement relative to support platform 12 in a direction of longitudinal axes 22 and 24 of metallic pieces 18 and 20 with buttresses 34 and 36. On the other hand, head portion 14 is free to move in a direction transverse to the longitudinal axes 22 and 24, as seen in FIG. 3 where rail 18 is supported on anvil 35 of head portion 14 with no obstructions to head portion 14 movement in the transverse directions thereon. With regard to head portion 16, head portion is permitted to move only in the directions of longitudinal axes 22 and 24, with typically the assistance of electrically insulated bearings and not in a direction transverse to them with head portion 16 confined within track 17 as shown in FIG. 5. The set up of this particular machine will permit movement transverse to longitudinal axes 22 and 24 of one metallic piece 18 and prevent movement of the other metallic piece 20 in such a direction but permit it in a direction along longitudinal axes 22 and 24. Vertical securement of metallic pieces 18 and 20 within head portions 14 and 16 respectively is provided with clamps 38 and 40 respectively.

Electrical power lead conductors 42 and 44, as shown in FIGS. 4 and 5, link metallic pieces or rails 18 and 20 respectively to transformers 43 and 45 respectively with electrical connectors 46 and 48 providing electrical contact to metallic pieces 18 and 20. It is preferable that lead conductors 42 and 44 are flexible to accommodate movements and any vibrations that may occur during operation. For this particular example, electrical connectors 46 and 48 are in contact with rails 18 and 20 at their web portions, however, contact could be made at other portions of rails 18 and 20 such as the top or bottom portions thereof. Transformers 43 and 45 are typically wound and are able to decrease voltage from a power source from proximately 480 volts to 3 to 13 volts. Transformers 43 and 45 for this example are linked to a power source capable of providing 75 kilowatts to 400 kilowatts of single phase alternating current. The completion of this circuit is when rails 18 and 20 are brought into contact with one another.

Figure 17A:
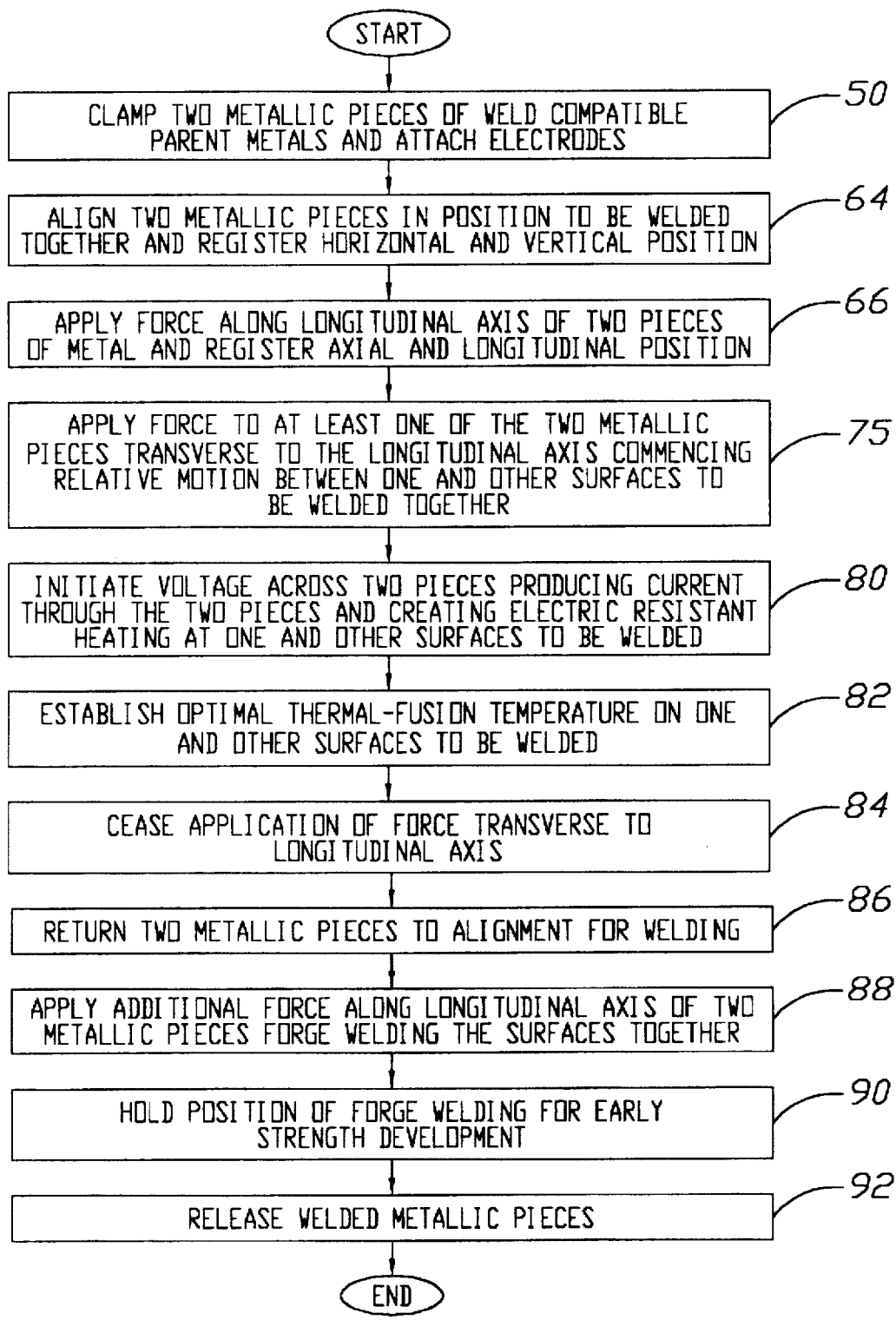
FIG. 17A is a flow chart of the process of the first embodiment.

With the clamping and securement of metallic pieces 18 and 20 into welding machine 10 and the securement of electrical connectors 46 and 48, this completes the first step 50 of the arcless process set forth in FIG. 17A.

Figure 16A:
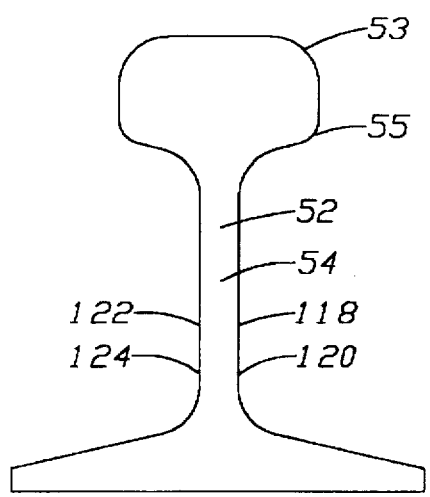
FIG. 16A is a profile cross section view of the one and other surfaces of the two metallic pieces in alignment to be welded.

Typically the next step in the process is to align two metallic pieces 18 and 20 into geometric alignment or for pieces with the same size and shape, into upright perimeter register with one another, as seen with surfaces 52 and 54 of metallic pieces 18 and 20 respectively having perimeters 53 and 55 respectively in FIG. 16A. This position is often the desired end welding alignment of the two metallic pieces 18 and 20, however, other alignments may be needed where at least a portion of surface 52 and 54 overlie one another. Typically metallic piece 18 is brought into a desired horizontal and vertical alignment position with metallic piece 20 with screw actuators. Horizontal screw actuators 58 and vertical screw actuators 56, as seen in FIGS. 1-4, are utilized to move metallic piece 18 into alignment with metallic piece 20. Correspondingly, horizontal transducer 60 and vertical transducer 62, as shown in FIGS. 1-4, provide the ability for the desired position to be registered with the operator controller as will be discussed below.

With properly aligning two metallic pieces 18 and 20 in a desired position for welding and registering that position, this completes step 64 of the arcless process set forth in FIG. 17A.

Figure 20A:
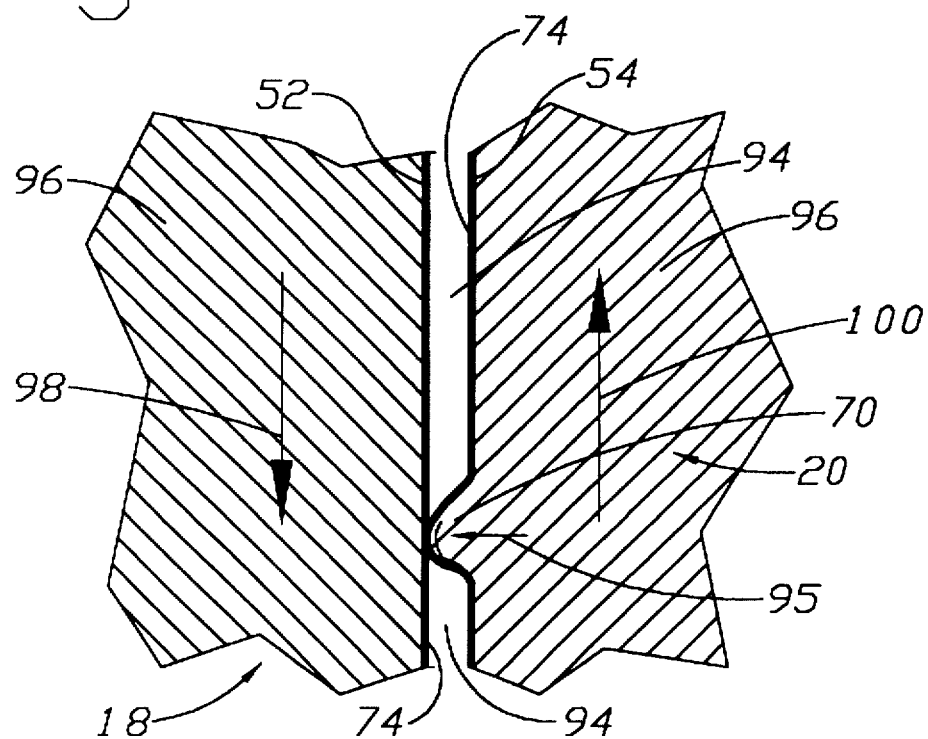
FIG. 20A is a first view in a series of two views of a prominence ablating on an opposing surface in the process of the first embodiment.
Figure 20B:
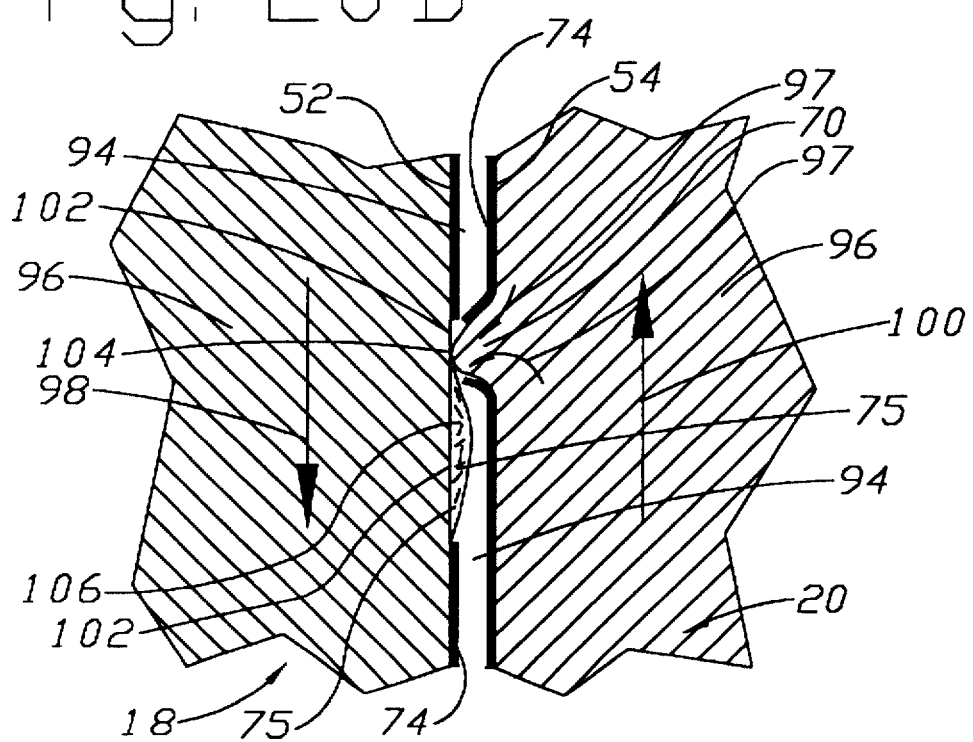
FIG. 20B is a second view in a series of two views of a prominence extruding parent metal from the ablated prominence in the first embodiment.

The next step in the arcless process 66, as set forth in FIG. 17A, is to apply a force along longitudinal axes 22 and 24 of metallic pieces 18 and 20 with axial actuators 68, as seen in FIGS. 1 and 5. This force will advance metallic piece 20 toward 18 until a plurality of prominences 70 of higher elevation, in which one prominence is shown in FIGS. 20A and 20B, which are positioned on both surfaces 52 and 54 abuts opposing surfaces 54 and 52 respectively. Prominences 70 are often of the elevation of 0.025 to 0.050 inches. Once surfaces 52 and 54 are in position, axial transducer 72 provides the information for registering the axial or longitudinal position with the operator controller to be discussed below of surface 54 to surface 52.

The application of force along longitudinal axes 22 and 24 for rails 18 and 20 is approximately 1000 pounds per square inch of surface area for typical cross section of railroad rail between 8.5 and 15.5 square inches. As shown in FIG. 20A, prominence 70 is abutting surface 52 with axial force having been applied in which in surfaces 52 and 54 including prominence 70 have undesirable oxide of parent metal 74 disposed thereon.

Figure 16B:
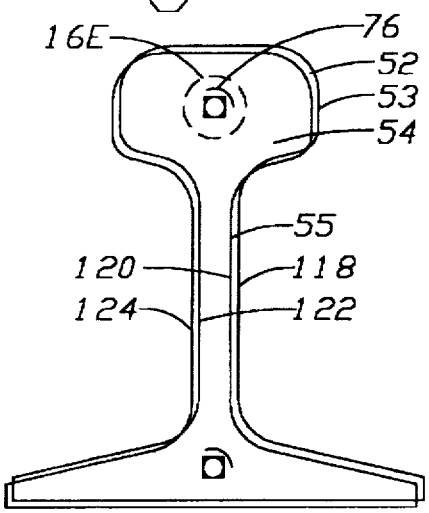
FIG. 16B is the view of FIG. 16A with movement imparted to at least one surface relative to other surface.
Figure 16C:
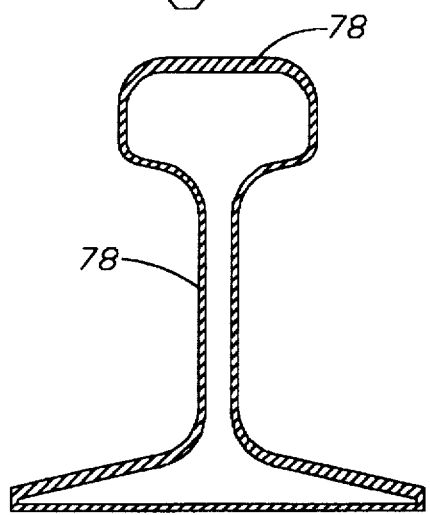
FIG. 16C is a schematic view of FIG. 16A indicating area of one and other surfaces exposed during relative movement imparted in FIG. 16B.

The next step 75 in the arcless welding process includes applying a force to at least one of two metallic pieces 18 and 20 transverse to longitudinal axes 22 and 24 of at least one of metallic pieces 18 and 20 commencing upright relative motion or movement between one and other surfaces 52 and 54 which are to be welded together. This relative motion or movement of metallic pieces 18 and 20 is in at least a first and second direction which are each transverse to the at least one of the metallic pieces 18 and 20 longitudinal axes 22 and 24 which also causes relative displacement of a cross section of each of the two metallic pieces 18 and 20 relative to one another and thereby causes relative displacement of at least portions of surface 52 and 54 in and out of contact with each other and transverse to longitudinal axes 22 and 24. This displacement involves relative displacement of a cross section of each of metallic pieces 18 and 20, in which each cross section is transverse to its respective longitudinal axis. These cross sections are each transverse to their respective longitudinal axis and are depicted, as for example, as surfaces 52 and 54, as can be seen in FIGS. 16A and 16B. This relative motion or movement can be seen in FIGS. 16B and 16C in which the relative movement indicated by arrow 76 has corresponding displacement of portions of surfaces 52 and 54 which as will be discussed in more detail below will provide portions of surfaces 52 and 54 moving in and out of contact with each other which is illustrated by the shaded area 78 in FIG. 16C which indicates the amount of surface of each surface 52 and 54 which comes out of contact with each other during the relative motion or movement. Relative motion between surfaces 52 and 54 can be accomplished with moving one metallic piece 18 and holding the other metallic piece 20, as is utilized in the example described herein, however, simple duplication of equipment and controllers as described below would permit both metallic pieces 18 and 20 to be moved to accomplish the relative movement as well.

Application of longitudinal force will be reduced during the relative movement to obtain an application of force in the transverse direction to longitudinal axes 22 and 24 to a maximum of about 1.5 total horsepower per square inch of surface at about 52 complete motion cycles per minute for surface 52 in motion. During that part of the heating process surfaces 52 and 54 are is very prone to forming premature welds in limited areas of seizure binding surfaces 52 and 54 together. The next step in the process as indicated as step 80 in FIG. 17A includes applying a testing voltage applied through metallic pieces 18 and 20 with the application of approximately 1 volt across surfaces 52 and 54 to prove the existence of electrical continuity and with electrical continuity proven the voltage across surfaces 52 and 54 will be increased to 3 to 13 volts with 30,000 to 60,000 amps for surfaces of 11.5 square inches providing electric resistant heating at surfaces 52 and 54.

In this process, the relative movement and electrical current continue for a period of 50 to 70 seconds to obtain optimal thermal-fusion temperature at surfaces 52 and 54. This optimal thermal-fusion temperature is typically measured indirectly by the total amount of electrical energy invested in the process. For example, high carbon steel such as used in rails 18 and 20 each having a surface area of 11.5 square inches require a total of about 0.16 kilowatt hours per square inch of surface to reach thermal fusion temperature for the entire surfaces 52 and 54. Other energy investments are quantitatively known for obtaining optimal thermal-fusion temperatures for other metals and alloys. This total energy investment can be easily tracked with equipment such as one channel of the many of an Allen Bradley Bulletin 1400 PD Power Monitor & Display Module.

During this portion of the process in which optimal thermal-fusion temperature has not yet been attained, softening of parent metal 96 does occur and is detected by the drop in resistive force to the force utilized to impart the relative movement by actuators 56 and 58. With this drop in resistive force and the commensurate lowering of the power consumption of actuators 56 and 58 which is sensed by another channel of the many of the same Allen Bradley 1400 PD, the longitudinal force or axial force imparted by actuator 68 must be drastically reduced, for example, from 1000 pound per square inch to 50 pounds per square inch to prevent the extrusion of the melted metal. Also, during the time of the process, the normal operating electrical resistance across surfaces 52 and 54 is around $25 \times 10^{-6}$ ohms for 11.5 square inches of carbon steel. This electrical resistance is monitored by the Allen Bradley 1400 PD and as the electrical resistance goes up the axial force exerted by actuator 68 is too low and film 106 which includes parent metal 96 as discussed below is thickening in an axial or longitudinal direction and surfaces 52 and 54 must be brought closer together to drop the resistance and approximately 100 pounds per square inch is applied to surfaces 52 and 54 to cause longitudinal displacement that displaces a portion of overly thick film 106 by transverse extrusion. This in turn, lessens the voltage required to drive the current through film 106 and provides an increase in driving voltage within metallic bodies 18 and 20 with a constant voltage source. On the other hand, as the electrical resistance goes down the axial force exerted by actuator 68 is too high and surfaces 52 and 54 must be allowed to melt into an increased thickness of film 106 by dropping to zero pounds per square inch in force thereby permitting film 106 to grow again and raise the resistivity of film 106 between surfaces 52 and 54 and correspondingly decreasing the driving voltage within metallic bodies 18 and 20. This moderation of axial or longitudinal force according to the softening of the parent metal or electrical resistance readings is exercised until sufficient high temperature exists in metallic pieces 18 and 20 to prevent such a rate of heat transfer from forged surfaces 52 and 54 as would cause quench hardening during cooling after forging is obtained, the next step in the process has been accomplished as step 82 in FIG. 17A.

With the thermal-fusion and body anti-quenching temperature obtained the next step includes ceasing the application of force transverse to the longitudinal axis and returning metallic pieces 18 and 20 to their desired alignment for welding which complete steps 84 and 86 in the process set forth in FIG. 17A for arcless welding. The electric current is continued to be passed through metallic pieces 18 and 20 through this cessation of force. Desired alignment, which has been mentioned earlier, can be whatever is needed by the operator, but often takes on overlying surfaces 52 and 54 of metallic pieces 18 and 20 having substantially the same size and shape perimeters 53 and 55 in upright register with one another as can be seen in FIG. 16A. The position for desired alignment, as earlier described, has been registered.

With surfaces 52 and 54 in desired alignment, the step of applying another or additional force along longitudinal axes 22 and 24 is applied with axial actuators 68. This force for high carbon steels, such as used in rails 18 and 20, is in an amount of 5.000 to 10,000 psi with holding such position for up to 10 seconds to develop early strength. Typically, the electric current is discontinued during the forging action. After forging is completed, metallic pieces 18 and 20, which are welded together are released from welding machine 10 and the final steps 88, 90 and 92 are completed in the arcless process set forth in FIG. 17A.

In the arcless welding process, with prominences 70 as shown in FIGS. 20A and 20B abutting opposing surface in this example surface 52, forms air gaps 94 between surfaces 52 and 54 where these surfaces overlie one another during the welding process with the axial or longitudinal force applied with axial actuators 68. Prominences 70 being positioned on both surfaces 52 and 54 likewise maintain air gaps 94 with abutting opposing surfaces 54 and 52 respectively across surfaces 52 and 54 where they overlie one another. Moreover, where prominences 70 abut, as for example, surface 52, a force stress in the direction of the longitudinal axis, indicated with arrow 95, within parent metal 96 imparting a compressive force at prominences 70 on parent metal 96 and oxidized parent metal 74 disposed on the at least a portion of one and other surfaces 52 and 54 positioned to overlie one another as seen in FIG. 20A.

With the relative movement of metallic pieces 18 and 20, indicated with arrows 98 and 100, in which the actual movement in this example is metallic piece 18 moving in a first and second direction transverse to longitudinal axes 22 and 24 in the direction of arrow 98.

This arcless welding process provides for the application of force with horizontal and vertical actuators 58 and 56 to at least one of said metallic pieces 18 transverse to the longitudinal axis 22 metallic piece in conjunction with a continued application of force with axial actuators 68 along longitudinal axis 24 imparts frictional ablation. ELS seen in FIG. 20A, in which prominence 70 abutting oxide of parent metal 74 on surface 52 to remove portions of oxide of parent metal 73 at surface 52 and on prominence 70 as shown in FIG. 20B. Likewise, this occurs on other prominences 70 and other prominences 70 positioned on surface 52 which ablates oxide of parent metal 73 off of itself as well as off of surface 54. In the presence of the electrical voltage placed across surfaces 52 and 54 electrical current passes through metallic pieces 18 and 20 providing electrical resistance heating at surfaces 52 and 54 at a location 104, as seen in FIG. 20B, in which frictional ablation removes portions of oxide of parent metal 73 providing multiple sites 104 of parent metal contact between surfaces 52 and 54. Multiple sites 104 of parent metal contact are developed across surfaces 52 and 54 where a plurality of prominences 70 are ablating opposing surfaces 52 and 54. With parent metal contact at multiple sites 104, electrical current conduction occurs between surfaces 52 and 54 at multiple sites 104 which develop across surfaces 52 and 54. The electric resistance heating creates an increasing temperature at surfaces 52 and 54 relative to temperature increase of its corresponding parent metal within its respective metallic piece 18 and 20. Thus, the temperature of the bodies of metallic pieces 18 and 20 which are spaced apart from their respective surfaces 18 and 20 which are receiving heat from surfaces 52 and 54 from conduction has elevated in temperature at a slower rate than surfaces 52 and 54 providing an increased current resistivity further elevating the temperature at surfaces 52 and 54. As a result of this elevating temperature melting parent metal 96 underlying oxide of parent metal 74 forms film 106 at surfaces 52 and 54 which includes melted parent metal 96 extruding from prominences 70, as shown in FIG. 20B, and indicated as to the direction of the same with arrows 97.

Film 106 of parent metal 96 carrying removed oxide of parent metal 73 increases in thickness, as described above, in a direction along longitudinal axes 22 and 24 of metallic pieces 18 and 20 with further elevating temperature from the increased electric current resistivity requiring an increase in driving voltage across film 106 and correspondingly providing lower available driving voltage from a source, transformers 42 and 44, of fixed voltage through metallic pieces 18 and 20. Thus, providing increased heat deposit rate and the temperature at the location of film 106 at surfaces 52 and 54 creating further melting of parent metal 96 at surfaces 52 and 54. Correspondingly, a relative lesser elevation of temperature of metallic pieces 18 and 20 bodies spaced from their respective surfaces 52 and 54 from increased whole circuit resistance reduces electric current conducting through metallic bodies 18 and 20. As a result, through electric resistant heating, surfaces 52 and 54 can heat relatively quickly, yet forging must occur after, some time as mentioned above, has transpired to permit conduction of surface heat to heat body to provide the most desirable conditions for thermal-fusion welding and prevent a quenching from the bodies of the respective surfaces 52 and 54.

To slow down the heating process, as described above, surfaces 52 and 54 are moved toward each other thinning a thickening of film 106 reducing current driving voltage across film 106 and increasing the current driving voltage through conducting lengths of metallic pieces 18 and 20. The increase in surfaces 52 and 54 temperatures can be sensed by a decrease in resistive force to the relative movement between surfaces 52 and 54 relative to the force applied along longitudinal axis. This reduction in resistive force can be sensed, as described earlier, by one of many channels of the Allen Bradley 1400 PD in which the resistive force may drop and cause the corresponding driving power to drop from five (5) horsepower to one (1) horsepower. If, for example there is reduction in resistive force with the axial or longitudinal force maintained at a certain level, this will indicate the temperature is elevating and indicate the need to move surfaces 52 and 54 closer together reducing the electrical resistance between surfaces 52 and 54 by thinning film 106 therebetween. This thinning provides for increase in driving voltage in metallic bodies 18 and 19. The moderation of the axial or longitudinal force with the change in electrical resistance is discussed earlier and permits the moderation of surface 52 and 54 heating as well as provide for metallic adequate body 18 and 20 heating to provide desirable welding conditions.

As also discussed above, with parent metal contact at multiple sites 104 as shown in FIG. 20B, as a result of a plurality of prominences 70 providing ablation over surfaces 52 and 54, relative movement repositions multiple sites 104 of parent metal contact over surfaces 52 and 54 providing electrical conduction at multiple sites 104 over surfaces 52 and 54 providing a distribution of heat across surfaces 52 and 54. Moreover, the relative movement transports the heat content of film 106 over surfaces 52 and 54 transverse to longitudinal axes 22 and 24 likewise distributing heat across surfaces 52 and 54.

With the elevating temperature being distributed substantially evenly across surfaces 52 and 54, the same provides substantially even melting of parent metal 96 of each of two metallic pieces 18 and 20 and forms substantially parallel isothermal planes within the bodies of each of two metallic pieces 18 and 20 being substantially perpendicular to longitudinal axes 22 and 24 of each of their respective two metallic pieces 18 and 20. As a result of such distribution, surfaces 52 and 54 form to be substantially perpendicular to each longitudinal axis 22 and 24 of each of their respective metallic pieces 18 and 20 providing a desired abutting alignment of surfaces 52 and 54 with the alignment of longitudinal axis 22 and 24 of each of metallic pieces 18 and 20 at the time of applying another or additional force advancing metallic pieces 18 and 20 together for thermal-fusion forged welding at surfaces 52 and 54 and preventing undesirable localized cooler strong parent metal 96 frustrations to forging and preventing entrapments of axially long deposits of molten metal that later contract and create void volumes known as "hot shorts".

Figure 16D:
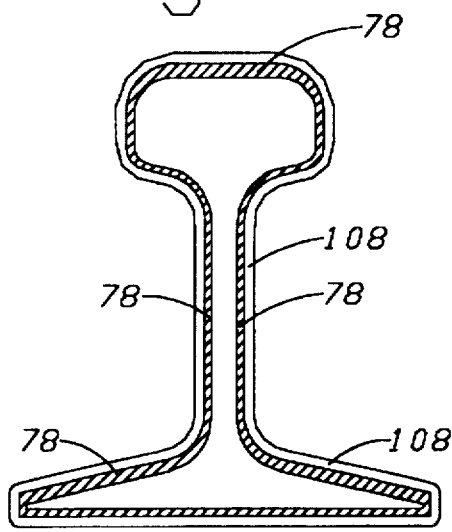
FIG. 16D is the schematic view of FIG. 16C including fin formed on periphery after forge.

As the process proceeds, melting continues forming film 106 with removing volume of parent metal 96 and oxide of parent metal 74 disposed on surfaces 52 and 54 from surfaces 52 and 54 causing a plane of contact between surfaces 52 and 54 to become substantially transverse to longitudinal axes 22 and 24 of each metallic pieces 18 and 20. The volumes of film 106 displace air content of air gaps 94 formed between plurality of prominences 70 on surfaces 52 and 54 abutting surfaces 54 and 52 respectively. The continued melting and the relative movement causes the air in air gaps 94 to purge to perimeters 53 and 55 of surfaces 52 and 54, moreover, volumes of film 106 will extrude to the outside of perimeters 53 and 55. This extruded volume of film 106 forms fin 108, as shown in FIG. 16D, which contains parent metal 96 and oxide of parent metal 73. The melting and relative movement continues which continues to transport the undesirable oxide of parent metal 73 to perimeters 53 and 55 until a film of substantially only parent metal remains on and between surfaces 52 and 54. The application of the forging or additional force along longitudinal axes 22 and 24 will cause film 106 containing undesirable oxide of parent metal 73 that would be positioned between surfaces 52 and 54 and already moved near perimeters 53 and 55 to be pushed and purged to outside perimeters 53 and 55 in forming fin 108.

This arcless welding process as set forth in FIG. 17A, with the maintenance of a force along the longitudinal axes 22 and 24 maintain surfaces 52 and 54 with prominences 70 in ablative relationship resulting in the direct metal contacts as described above. With this maintenance of force and relative movement, the electric current passes through these metal contacts and does not create the opportunity to arc between surfaces 52 and 54, as well as, maintains the current fluctuation with changing metal contacts to ±5% during the total time of the heating process. As a result, a very even and constant power demand process is obtained.

An important aspect of the present invention is to impart relative movement between surfaces 52 and 54, as discussed above. The relative movement is in at least a first and second directions in which these directions are both transverse to longitudinal axes 22 and 24. This relative movement also causes relative displacement between a cross section of each of metallic pieces 18 and 20, in which each cross section, depicted as for example surfaces 52 and 54 in FIGS. 16A and 16B, is transverse to its respective longitudinal axes 22 and 24. Moreover, this relative movement displaces at least portions of surfaces 52 and 54 transverse to longitudinal axes 22 and 24. This relative movement is upright between surfaces 52 and 54 and which includes a controlled patterned of movement in which the controlled pattern positions a part of one surface 52 and part of other surface 54 in and out of contact with each other as can be seen for example in FIG. 16B and 16C. In FIG. 16B, it can be seen perimeters 53 and 55 move out of alignment with each other and with the relative movement operating the shaded area in FIG. 16C portrays an area in which surface 52 moved out of contact with surface 54. This controlled pattern of movement is generated and controlled with controller 110 as discussed below.

The controlled pattern movement which imparts relative movement between surfaces 52 and 54 is continuous for a time period, as discussed earlier, imparting substantially uniform electric resistance heating across surfaces 52 and 54. A preferable configuration of this controlled pattern is an orbit which is typically of a predetermined pattern which is repeating and regular in configuration. A few of these orbiting patterns include circle orbit as illustrated in FIG. 22B with circle 112 in which the direction of relative movement is indicated with arrowheads 114. Other orbiting patterns would include ellipses and other opened figures and other patterns which move parts of surfaces 52 and 54 in and out of contact with each other. This controlled pattern of movement contemplates the configuration of relative movement between surfaces 52 and 54 as being random directions of movement such as what is illustrated for example in FIG. 22A in which pattern 116 is a pattern simulating a random pattern.

Figure 16E:
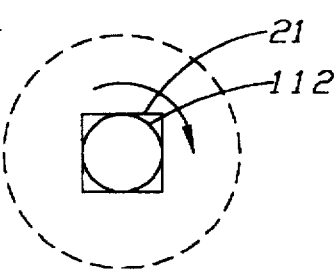
FIG. 16E is an enlarged view of that which is circled as 16E in FIG. 16B.
Figure 22A:
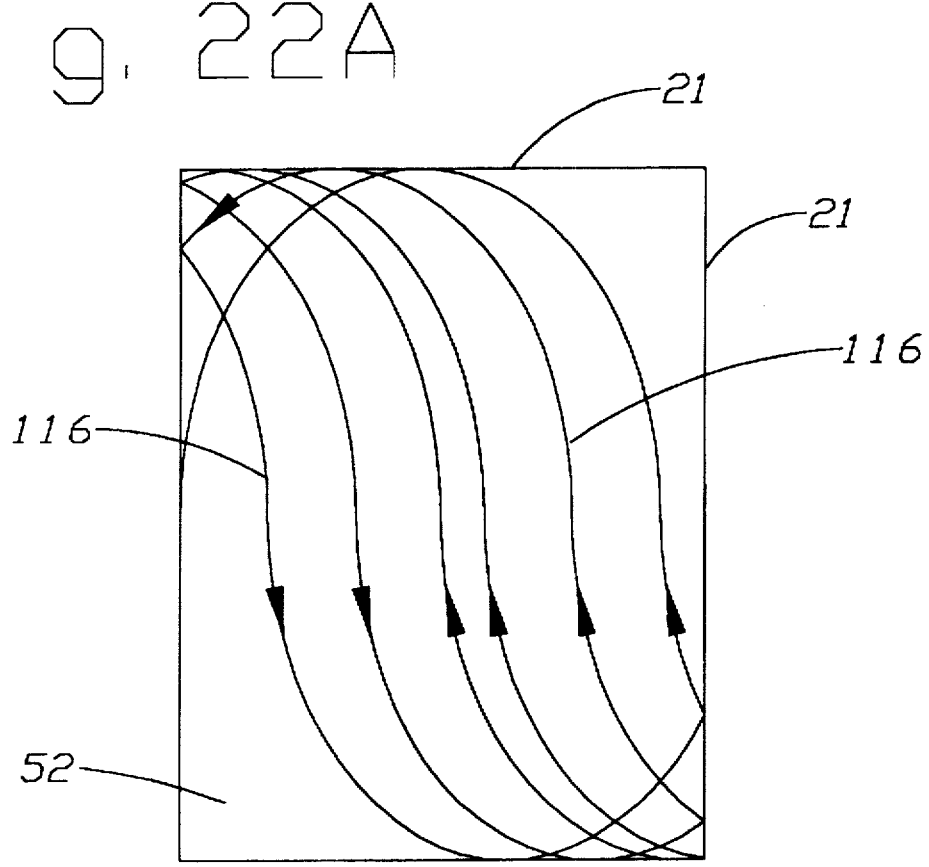
FIG. 22A is an illustration of a circular orbit controlled pattern of relative motion of the two metallic pieces as would be travelled within the desired and adjustably set limits of travel which appears as box 21 in FIG. 16B.
Figure 22B:
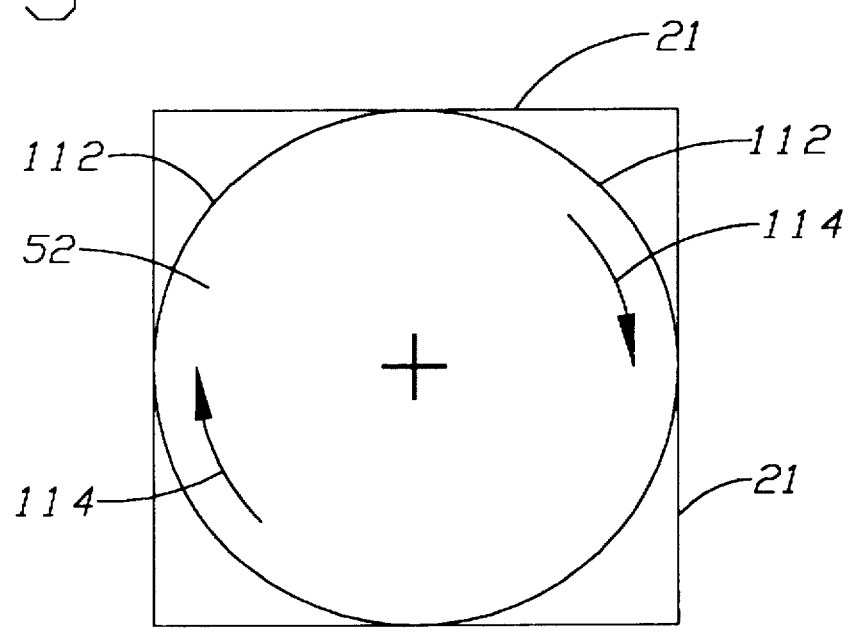
FIG. 22B is another illustration of a random controlled pattern of relative motion of said the metallic pieces as would be travelled within the desired and adjustably set limits of travel which appears box 21 in FIG. 16B.

This controlled pattern of relative movement has surfaces 52 and 54 move in restricted or limited areas of movement for more desirable results as shown in FIGS. 16E, 22A and 22B and dsignated as 21. It would not be desirable to have the relative movement move surfaces 52 and 54 out of alignment so far as to cause an undue amount of their area to be out of opposition and out of heating electrical conduction. In fact, it is preferable to be operating surfaces 52 and 54 to move about a $\frac{5}{32}$'s (0.1563) of an inch out of alignment for railroad rails 18 and 20, as is demonstrated in FIGS. 16B and 16C. In fact, it is desirable to restrict the dimensions of the relative movement so as to restrict diametrically opposing edges of metallic pieces 18 and 20 from passing over one another. This can be demonstrated in FIGS. 16A and 16B, where one surface 52 and other surface 54 each have first edge 118 and 120 respectively and a second diametrically opposing second edge 122 and 124 respectively at each perimeter 53 and 55 respectively. In which first edge of 118 of one surface 52, shown in FIG. 16A, is positioned closer to said first edge 120 of other surface 54 than to second diametrically opposing edge 124 of other surface 54 with one and other surfaces 52 and 54 facing each other and substantially centrally aligned. The controlled pattern movement prevents first edge 118 of one surface 52 and second diametrically opposing edge 124 of other surface 54 from passing over one another.

The relative movement is maintained at substantially a constant speed which contributes to the even distribution of electrical resistant heating and film 106. During the relative movement of the welding process, it is necessary to have the availability to provide a large enough force through actuators 56 and 58 to be irresistible and be capable of rupturing all areas of premature fusion welding which may arise. In the present example of railroad rails 18 and 20, it would be adequate to provide 1000 pounds per square inch of surface of shear force across surfaces 52 and 54 very quickly through actuators 56 and 58 to accomplish the constant speed to surface 52 relative to surface 54 despite possible premature fusion events.

Figure 23:
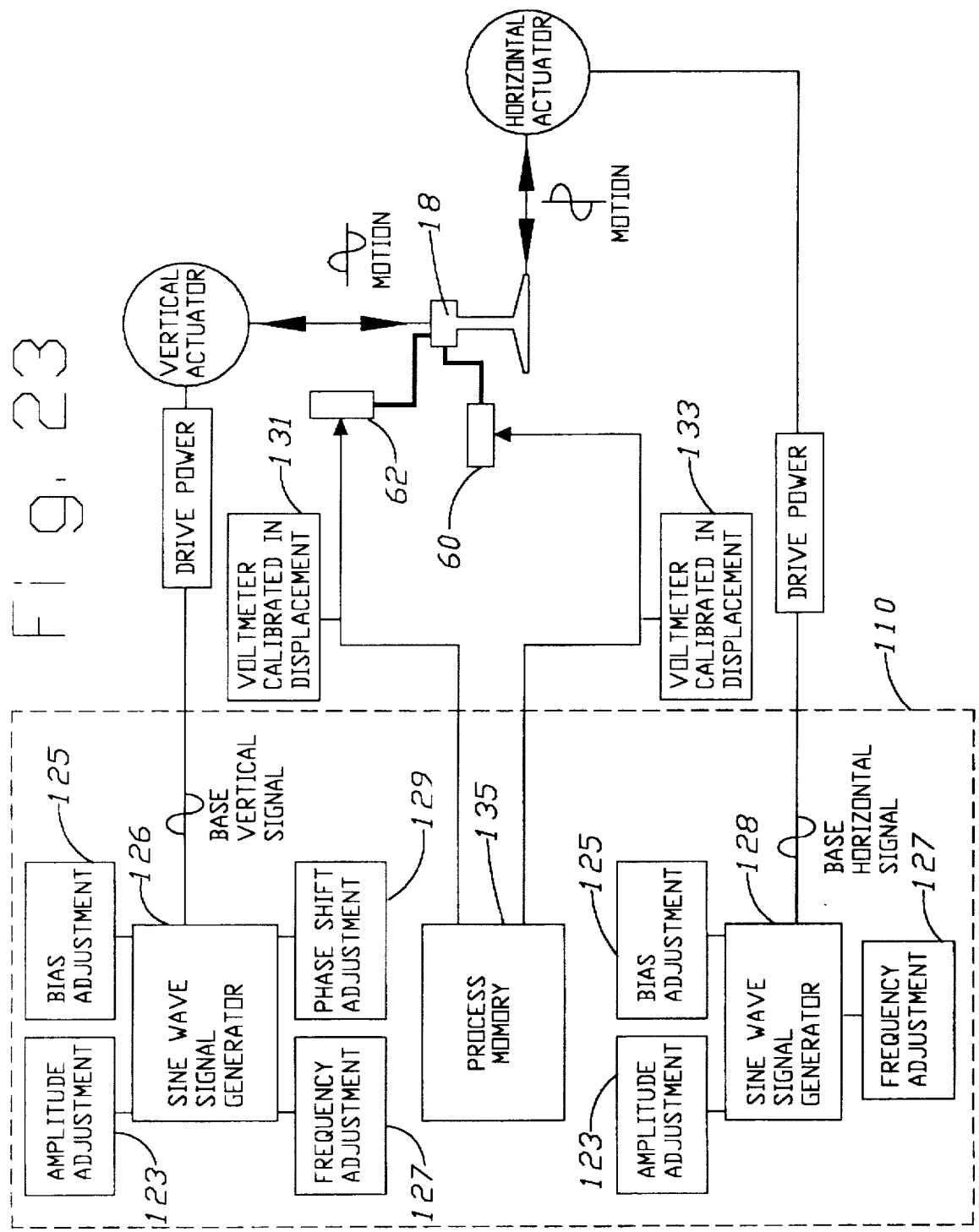
FIG. 23 is a block schematic diagram of the controller for imparting controlled pattern of motion for metallic pieces.

This relative movement can be provided in a number of ways, however, for the present discussion, one approach will be set forth utilizing controller 110, as set forth in FIGS. 14 and 23. Controller 110 is connected to vertical and horizontal linear position transducers 60 and 62; vertical and horizontal actuators 56 and 58; and longitudinal or axial transducer 72 and longitudinal or axial actuator 68, as shown in FIG. 14.

First with regard to longitudinal linear transducer 72 and longitudinal actuator 68, the operator can record and register the position of head portion 16 with metallic piece 20 in axial or longitudinal force position and know the position of surface 54 at the initiation of the welding process. During the process the operator will be able to monitor the position of surface 54 and adjust the longitudinal force of actuator 68 such as lowering the force as mentioned above at the early initiation of ablation and as surfaces 52 and 54 become elevated in temperature the force can be reduced. With the thickening of film 106 actuator 68 can be utilized to thin film as discussed above and vice versa. Additionally, actuator 68 is utilized to exert the additional or another force for forging metallic pieces 18 and 20 together when welding.

With regard to imparting the relative movement of controlled patterns, one simple set up, as shown in FIG. 23, of utilizing two sine signal wave generators 126 and 128, such as a Wavetek Function Generator Model FG2A, or other types of signal wave generators, one each for vertical and horizontal actuators 56 and 58 respectively can be used. Vertical and horizontal actuators 56 and 58 will be actuated through signals from bias adjustments 125 to bring metallic pieces 18 and 20 into desired alignment. The operator can register the desired positions from transducers 60 and 62 for desired overlying alignment of surfaces 52 and 54 for final forge welding. Transducers 60 and 62 transmits voltage to calibrated voltmeters 131 and 133 respectively and the calibrated desired overlying positions of surfaces 52 and 54 are registered in memory of programmable logic controller 135 set forth below. These positions can be readily obtained when needed at time of forging with storing such positions in control 110 memory in order for sine generators 126 and 128 to operate actuators 56 and 58 to move metallic pieces 18 and 20 into relative desired position for forging. Additionally, the operator will operate sine signal generators 126 and 128 for the needed amplitude vertical and horizontal adjustments 123 and to provide the proper range of movement, as depicted in FIGS. 16E, 22A and 22B as box 21. This range of movement across surfaces 52 and 54 of the relative movement was discussed above for rails 18 and 20. Additionally, the operator can provide frequency adjustment 127 for each respective direction to provide for the frequency of tracking the pattern for the relative movement in each direction. Also, the operator can provide a phase shift adjustment 129 of signal generator 126 relative to signal generator 128 to provide the desired configuration of the pattern of the relative movement of surface 52 to surface 54.

The operator can simply witness resulting motion and make appropriate adjustments to sine signal generators 126 and 128. With sine signal wave generators 126 and 128 at the same frequency the relative movement results in the pattern of an orbit of circle 112, as shown in FIG. 22B imparted with vertical and horizontal actuators 56 and 58. The operator can operate generators 126 and 128 in different frequencies to obtain relative motion in a controlled pattern that is random 116, as seen in FIG. 22A, with vertical and horizontal actuators 56 and 58. Other controlled patterns can be easily generated with the adjustment of sine signal generators 126 and 128.

Sine signal generators 126 and 128 each provide a characteristic voltage amplitude and frequency or base signal. At the time of obtaining optimal thermal-fusion temperature, the operator or programmable logic controller will operate actuators 60 and 62 to bring metallic pieces 18 and 20 back into desired overlying relationship for forging.

This straight forward dual sine generator controller 110 is merely one way of imparting the desired relative movement through actuators 56 and 58. Once again, the relative movement of metallic piece 18 while holding 20 in a stationary position is one way of operating the process, however, as mentioned earlier, with duplication of actuators driven by controllers, both metallic pieces 18 and 20 could be placed into desired motion providing the necessary relative movement.

This arcless welding process as well as the following limited arcing and interstitial welding processes can be operated by a manual operator under parameters herein discussed. However, it is contemplated that the same processes could be carried out with the equipment described herein and controlled with programmable logic controller incorporated as part of controller 110 programmed into its operational memory an algorithm containing the parameters discussed herein. A typical programmable logic controller for this purpose would be an Allen Bradley SLC-503 logic controller.

Now with regard to a limited arc welding process for thermal-fusion forge welding, this process utilizes the same equipment as described above for the arcless process and follows the steps set forth in FIG. 17B.

With regard to FIG. 17B, the steps in the limited arcing welding process similarly track steps of arcless process discussed above and will be discussed below.

First, with the clamping and securement of metallic pieces 18 and 20 into welding machine 10 and the securement of electrical connectors 46 and 48 and shown in FIGS. 1 through 5 and described above as first step 50 of the arcless process set forth in FIG. 17A is the same for step 134 for the limited arcing process set forth in FIG. 17B.

Second, with properly aligning two metallic pieces 18 and 20 in a desired position for welding and registering that position, this completes step 136 of FIG. 17B which is the same as step 64 of the arcless process set forth in FIG. 17A and described above.

Third, the next step includes applying a force along longitudinal axes 22 and 24 of metallic pieces 18 and 20 respectively to register the longitudinal position of plurality of prominences 70 positioned on surfaces 52 and 54 to abutting opposing surfaces 54 and 52 respectively. Once surfaces 52 and 54 are in position, axial transducer 72 provides the information or registering the axial or longitudinal position of surface 54 to surface 52 with controller 110. This completes step 138 of the limited arcing process as set forth in FIG. 17B which is in more detail described above as step 66 in the arcless process found in FIG. 17A.

Fourth, the limited arcing process diverts from the arcless process with the removal or reduction to zero of the application of the longitudinal force after the above position of the prominences is obtained and prior to the next step. This step 140 is set forth in FIG. 17B.

Fifth, the application of force to at least one of metallic pieces 18 and 20 is imparted in a direction transverse to longitudinal axes 22 and 24 commencing relative movement between surfaces 52 and 54 which are to be welded together. However, unlike the above discussed ablation of the arcless process, the limited arcing process involves collision of plurality of prominences 70 while they are moving in a direction transverse to longitudinal axes 22 and 24. This portion of the process will be discussed in more detail below.

Sixth, the next step 144 of the limited arcing process in FIG. 17B, is similar to step 80 as above discussed in the arcless process in FIG. 17A. This step includes applying a testing voltage applied through metallic pieces 18 and 20 with the application of approximately 1 volt across surfaces 52 and 54 to prove electrical continuity and with electrical continuity proven the voltage across surfaces 52 and 54 will be increased to 3 to 13 volts with 30,000 to 60,000 amps providing electric resistant heating at surfaces 52 and 54 for surfaces of 11.5 square inches. Through the process the relative motion will effectuate voltage fluctuations characteristic of the welding machine of ±¼ volt, which will be discussed further below. The effects of the electrical voltage and current will be discussed in more detail below.

Seventh, the remaining steps 146, 148, 150, 152, 154 and 156 in FIG. 17B in the limited arcing process involving establishing optimal thermal-fusion temperature on surfaces 52 and 54; ceasing application of force transverse to longitudinal axes 22 and 24; returning metallic pieces 18 and 20 to alignment for welding; application of an additional force along longitudinal axes forge welding surfaces 52 and 54 together; holding position of the forge for early strength development; and releasing welded metallic pieces 18 and 20 are the same as the arcless process steps 82, 84 86, 88, 90 and 92 of FIG. 17A and described above.

The limited arcing process utilizes the transverse collision of plurality of prominences 70 of opposing surfaces 52 and 54 in conjunction with passing electrical current across these locations of collision on surfaces 52 and 54 that provide the elevation of temperature to obtain the optimal thermal-fusion temperature of the parent metal 96 of metallic pieces 18 and 20. At the same time, the process provides a cleaner and safer process with maintaining the axial position of surfaces 52 and 54 in close proximity to one another in that their separation is less than the summed height of the interfering prominences of opposing surfaces 52 and 54.

As has been discussed earlier and now referring to FIGS. 19 A-D, plurality of prominences 70 positioned on surfaare constd 54 are constructed of parent metal 96, as in the present example high carbon steel used in railroad rails 18 and 20, and coated with oxidized parent metal 74 positioned thereon. Parent metal 96 which underlies coating of oxide of parent metal 74 at surfaces 52 and 54 is predisposed to exothermically develop oxidized parent metal coatings 74 at surfaces 52 and 54 in the presence of elevated temperatures and exposure to air.

As mentioned above, the limited arcing process removes application of force along longitudinal axes 22 and 24 and is done so prior to applying force to at least one metallic pieces 18 and 20 to provide relative movement. Once again, the relative movement is the same for the arcless and the present limited arcing processes and is described in detail above.

Figure 19A:
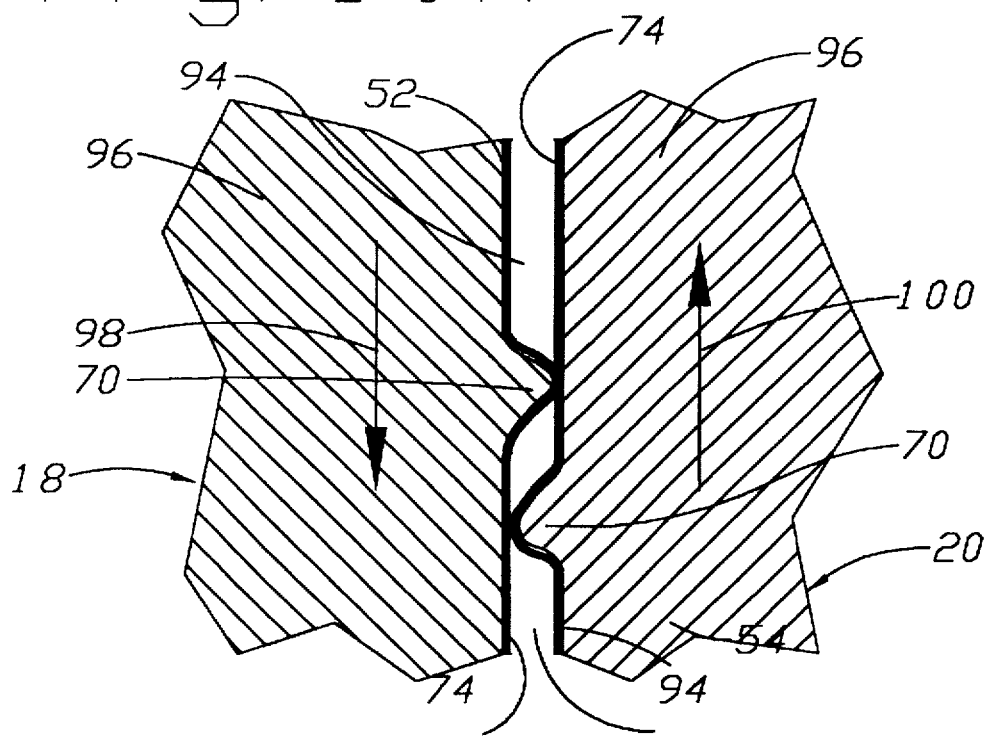
FIG. 19A is a view in a series of views of prominences, in the process of the first embodiment, of opposing one and other surfaces about to collide while moving in a transverse direction.
Figure 19B:
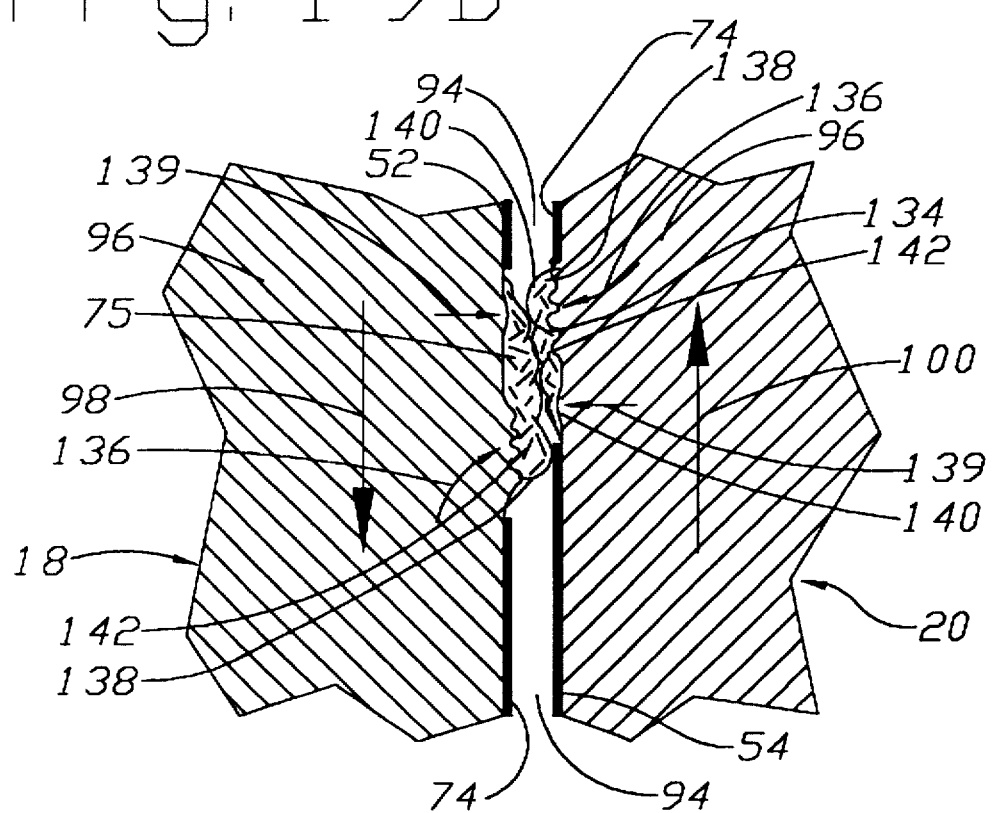
FIG. 19B is another view in the series of views of prominences, in the process of the first embodiment, of opposing one and other surfaces having collided while moving in a transverse direction.

An important aspect of this limited arcing process includes a prominence heating cycle which includes a step of imparting the relative movement causing at least one of plurality of prominences 70 on one surface 52 of piece 18 and at least another of plurality of prominences 70 on other surface 54 of piece 20 to collide with each other traveling in a direction, indicated by arrows 98 and 100, as seen in FIG. 19A, transverse to longitudinal axes 22 and 24. This collision, as seen in FIG. 19B, shatters oxidized of parent metal coating 74 of each of the at least one of plurality of prominences 70 and each of the at least another of plurality of prominences 70, as seen in FIGS. 19A and 19B. As a result of this collision, prominences 70 have their interfering portions removed reducing the elevation of each of prominences 70 relative to their respective surface 52 and 54. Air gaps 94 are formed between one and other surfaces 52 and 54 with uncollided prominences and prominences with the reduced elevation positioned thereon as seen in FIGS. 19A and 19B. Even though spacing apart of one and other surfaces 52 and 54 exists, parent metal 96 of each of prominences 70 are placed in cohesive and electrically conductive contact 134 with one another providing electric resistant heating.

This prominence heating cycle which includes a step of at least a portion of the electrical current passing through parent metal 96 of each of the at least one of plurality of prominences 70 and at least another of plurality of prominences 70 in contact 134 with each other providing electric resistant heating and elevating the temperature of parent metal 96 in each of prominences 70 and axially and radially supporting substrata of parent metal 96 of each prominences 70 thermally expanding parent metal 96 of the substrata, in the direction of arrows 136, and parent metal 96 in each of prominences 70 extruding parent metal 96 of the substrata and each prominences 70 axially, as shown by arrows 136, in a pliable state 138 from each of prominences 70 into air gaps 94.

The prominence heating cycle which includes a step in which a portion of pliable extruded parent metal 138 at the elevating temperature exothermically forms in air gaps 94 an oxide of parent metal 74 outside of each of prominences 70 elevating the temperature from the exothermic formation along one and another surfaces 52 and 54 with the relative movement moving the portion of extruded pliable parent metal 138 transverse to longitudinal axes 22 and 24.

The prominence and heating cycle further includes a step in which a portion of parent metal extruded 138 into air gaps 94 from each prominences 70 continues to extrude and the portion of extruded parent metal 138 is transported by the relative movement to overlie one and other surfaces 52 and 54 and corresponding adjacent supporting substrata of prominences 70. This in conjunction with elevating temperature of adjacent supporting substrata causes thermal expansion of adjacent supporting substrata of parent metal 96 and by thermal expansion, indicated with arrows 139 as seen in FIGS. 19B and 19C, elevates further prominences 140, as seen in 19D, on one surface and other surfaces 52 and 54 to a height sufficient to collide with yet other uncollided prominences 70 or further newly created prominences 140 positioned on an opposing surface 52 and 54 of newly formed or further prominences 140.

This prominence heating cycle includes a step in which substrata parent metal 96 of each of prominences 70 which extruded parent metal 96 therefrom and from which heat was conducted to adjacent substrata, thermally contract and axially lower the elevation of each prominences 70, as seen in FIG. 19D.

The prominence heating cycle also includes a step in which the relative movement causes another portion of pliable parent metal 138 extruded from each of prominences 70 to move transverse to longitudinal axes 22 and 24 across surfaces 52 and 54 remaining in contact with each other with a cohesive formation of elongated bodies 142 of parent metal 96, as seen in FIG. 19B. Elongated bodies 142 of parent metal 96 extend from each of prominences 70 along surfaces 52 and 54 respectively elevating the temperature of parent metal 96 within elongated bodies 142 with electrical current continuing to pass through the parent metal providing electrical resistant heating as the elongated bodies 142 continue to elongate from the relative movement.

Elongated bodies 142 continue to elongate until contact of parent metal breaks, as seen in FIG. 19C, and an electric arc 144 forms between the now separated broken ends of elongated bodies 142 of extruded parent metal from each of prominences 70 in an atmosphere which includes ionized vapor of parent metal formed from the elevating temperature of the parent metal within elongated bodies 142 until a means for extinguishing the arc 144 extinguishes the same.

The means for extinguishing the arc includes a separate parent metal contact 146, as seen in FIG. 19C in which elongated body 142 is about to contact parent metal contact surface 146, between one and other surfaces 52 and 54 of lesser electrical resistance than the electrical resistance experienced by arc 144, in proximity to arc 144, providing a path of less resistance for the electrical current passing through arc 144 and diverting the electrical current through separate parent metal contact 146.

Another means for extinguishing the arc includes at least one end attachment point of the arc 144 moving along a path on a surface of said parent metal of the elongating bodies 142 of extruded parent metal 96 and blocked from further travel by engaging intervening electrically insulative oxide of parent metal 74, as seen in FIG. 19C.

The electric resistance heating and arc 144 elevates the temperature of parent metal of prominence 70 and other prominence 70 positioned on surfaces 52 and 54 causing a change of state of at least a portion of the another portion of parent metal which was extruded from prominence 70 and other prominence 70 to pressurized gaseous bubble inclusions between one and other surfaces 52 and 54 which in venting form spatter. This spatter is distributed over surfaces 52 and 54 further materially elevating the surfaces to prominences and elevating the temperature of surfaces 52 and 54 and oxygen is combined with parent metal 96 thereby reducing the amount of oxidized parent metal 74 from between surfaces 52 and 54.

With surfaces 52 and 54 overlying one another in narrow separation to one another of less than the height of tallest prominence 70 or other prominence 70 substantially cohesively trap spatter onto one and other surfaces 52 and 54 contributing to elevation of new prominences 140.

This prominence heating cycle removes a substantial portion of oxidized parent metal 74 from between one surface and said other surface 52 and 54 in which oxidized parent metal 74 elevating in temperature in the presence of electric current passing through parent metal 96 and electric arc 144 provides localized heating until oxidized parent metal 74 endothermically disassociates gaseous oxygen therefrom creating liquid parent metal and gaseous oxygen with the absorption of the localized arc heating. This reduces the amount of oxidized parent metal 74 from between surfaces 52 and 54. This process furthermore is conducted in the contained volume of ambient air and oxygen is the only component of air that is a non-inert gas and is present between surfaces 52 and 54 which in the presence of elevated temperatures of this process decarburizes metallurgical carbon from parent metal 96 and forms carbon monoxide and carbon dioxide which are in turn inert gases to the metallic constituents of steel and that block new air entry. These inert gases will be substantially expelled from between surfaces 52 and 54 as the result of forging. In all, oxygen is substantially removed from between surfaces 52 and 54 with this welding process providing a desirable weld.

The relative movement imparted through the prominence heating cycle provides necessary movement of one and other surfaces 52 and 54 to have a simultaneous existence of a multiplicity of other prominence and heating cycles in different stages of maturation of the prominence and heating cycle across portions of one and other surfaces 52 and 54 which overlie one another. This simultaneous existence of the prominence and heating cycle contributes in conjunction with the relative movement to the uniformity in heating across surfaces 52 and 54. Moreover, with this simultaneous existence of prominence and heating cycles in different stages of maturation across surfaces 52 and 54 will have numerous metallic contacts 134 between surfaces 52 and 54 at prominences 70 which preserves the continuity of electric circuit and the value of electric resistivity at surfaces 52 and 54. Thus, the electric current heating is sustained at a substantially constant value which permits the limited arcing process to operate without substantial circuit caused inductive reactance voltage variation resulting in not having in-operation of the process adjustments to counteract any large current and resultant voltage variation such as ie. longitudinally separating surfaces 52 and 54, or interrupting the current flow.

In the prominence and heating cycle with the elevated temperature of the substrata of at least one prominence 70 and another prominence 70 elevates the temperature axially and radially of adjoining substrata causing parent metal 96 in adjoining substrata to expand and elevate a portion of one and another surfaces 52 and 53 adjacent to at least one and another prominences 70 to form a new prominence 140 adjacent to each of prominence 70 and another prominence 70 of sufficient height for new adjacent prominences 140 to collide with further prominences 70 positioned on opposing surfaces of one and other surfaces 52 and 54.

As discussed above, cease applying force to at least one of metallic pieces 18 and 20 transverse to the direction of longitudinal axes 22 and 24 of at least one metallic pieces 18 and 20 stopping relative movement between one surface and other surface 52 and 54. Relative movement between one surface and other surface 52 and 54 is stopped in a desired overlying relationship to one another and forging two metallic pieces 18 and 20 together with one and other surfaces 52 and 54 having obtained an optimum temperature for thermal-fusion forged welding. Optimum temperature for thermal-fusion welding is determined by the total amount of electrical energy invested in the process which are known amounts for many metals and metallic alloys.

Similarly as described above for the arcless welding process, the limited arcing process applies another force along longitudinal axes 22 and 24 advancing, with axial actuator 68, one and another surfaces 52 and 54 toward one another forge fusing one and other surfaces 52 and 54 and forcefully extruding said oxidized parent metal 74 to outside of one and another surfaces 52 and 54.

Desired alignment, often for pieces 18 and 20 for one surface and other surface 52 and 54 each having substantially the same perimeter 53 and 55 shape and dimension is one surface 52 in upright register with other surface 55.

The relative movement between one and other surfaces 52 and 54 includes a controlled pattern of movement in which the controlled pattern positions a part of one surface 52 and other surface 54 in and out of contact with other surface 54 and one surface 52 respectively. The positions of plurality of prominences 70 of each one and other surfaces 52 and 54 provide collisions with a plurality of opposing prominences 70 of each the other and one surfaces 54 and 52 respectively in a transverse direction to longitudinal axes 22 and 24.

The relative movement of this limited arcing welding process is imparted in the same way with the same equipment as described above in the arcless process. As described earlier, either one metallic piece 18 is displaced and the other metallic piece 20 is held into place or similar equipment is employed for both metallic pieces 18 and 20 in which the relative movement involves both metallic pieces 18 and 20 being displaced. The controlled patterns of movement can be the same and the motion can be controlled by equipment such as controller 110 utilizing two sine signal generators 126 and 128 or the like.

The relative movement, in this limited arcing process, of surfaces 52 and 54 distribute the elevating temperature substantially evenly across surfaces 52 and 54 providing substantially an even melting of parent metal 96 of each two metallic pieces 18 and 20 and forming parallel isothermal planes within each of two metallic bodies 18 and 20 substantially perpendicular to longitudinal axes 22 and 24 of each of their respective two metallic pieces 18 and 20. This relative movement helps to form one and other surfaces 52 and 54 substantially perpendicular to each longitudinal axis 22 and 24 of each of their respective two metallic bodies 18 and 20 providing a desired abutting alignment of one and other surfaces 52 and 54. With this squared off surfaces 52 and 54 they are ready to position in a desired overlying relationship often with the alignment of longitudinal axis 22 and 24 of each of two metallic pieces 18 and 20 at the time of a thermal-fusion forge welding of two metallic pieces 18 and 20 together at one and other surfaces 52 and 54. Often, as in the case of rails 18 and 20, the desired overlying relationship will have rails 18 and 20 in register with each other at time of forging.

It should be noted that a welding process could move between or in and out of arcless and limited arcing process with the introduction of axial or longitudinal force along longitudinal axes 22 and 24 by the operator.

Figure 18:
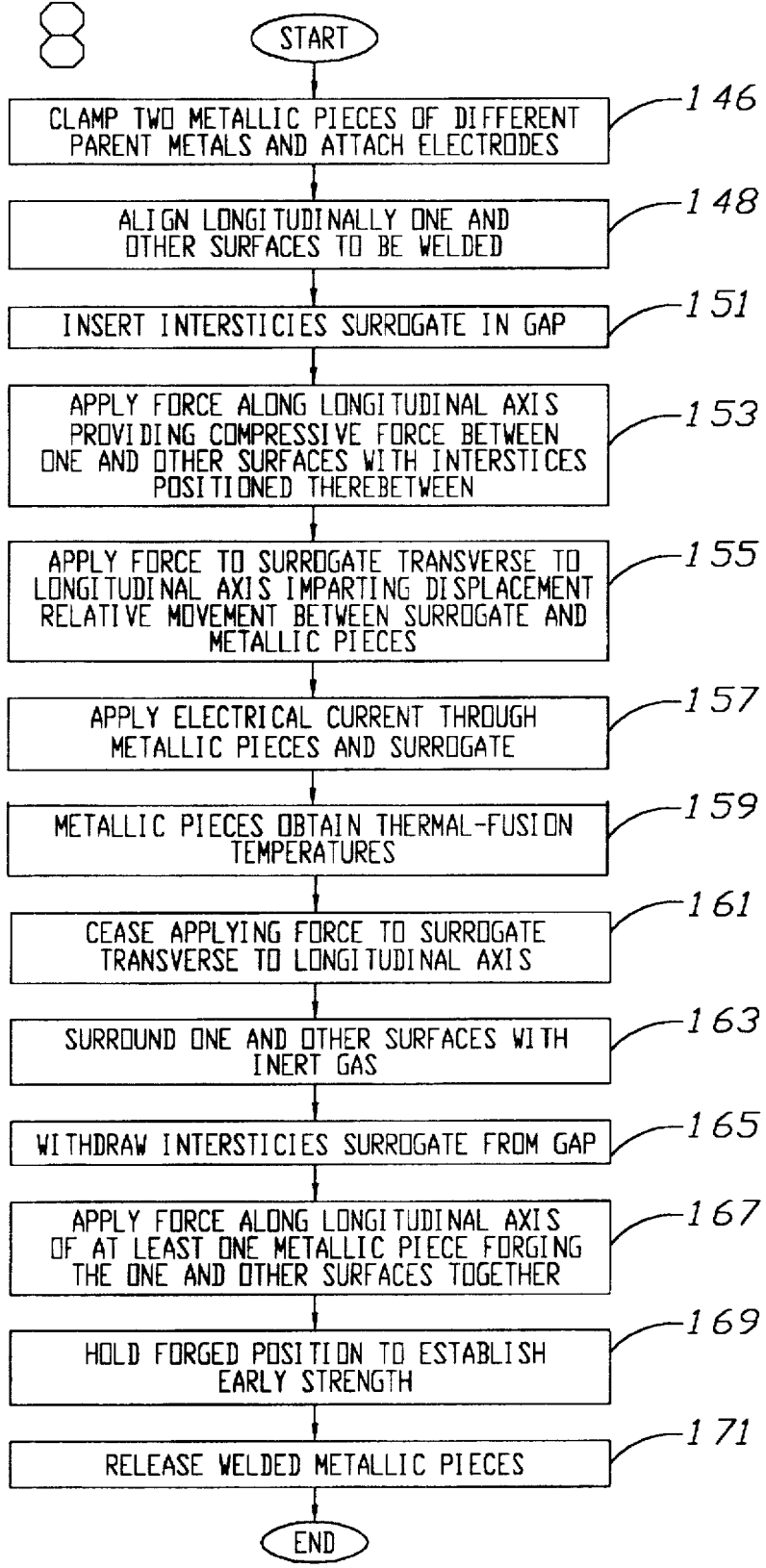
FIG. 18 is a flow chart of the process of the another embodiment.

Now with regard to the third improved welding process, the steps to be followed for this interstitial welding process are set forth in FIG. 18. This interstitial process utilizes substantially the same equipment as set forth above for the arcless and limited arcing processes but with some variations that will be set forth below and shown in FIGS. 3, 6–13, 15 and 23.

Like the arcless and limited arcing processes discussed above the first step 146 is similar to step 50 of the arcless process and 134 of the limited arcing process except for the fact that this interstitial process parent metals 154 and 156 of metallic pieces 150 and 152 respectively are different and are incompatible during heating ie. have thermal-fusion temperatures that are not overlapping. However, metallic pieces 150 and 152 would need to be of metals that evidence the ability to have a wide range of percentage of composition of each of the metals in forming an alloy in order to form a desirable weld in this process.

The interstitial welding process utilizes at least one electrically conductive surrogate piece 162 interposed between two metallic pieces 150 and 152 of different parent metals 154 and 156 in which surrogate piece 162 is constructed of a material that is of a higher melting temperature than metallic piece 150 and 152, in which surrogate 162 is in contact. Two of several universal surrogate constructions include graphitic carbon and tungsten. Both have low heat transfer rates and electrical resistances in the working range. Both have high melting temperatures and have strength to accept the required axial force. Where these two materials are too resistive or heat too much, materials of less resistivity and greater heat transfer rate can be employed with internal heat exchange cooling circuits, where needed. As a result, at least one surrogate piece 162 has little if any interaction or mergence of material with metallic pieces 150 and 152 during the process. Often times two different components 170 and 172 of different compositions of material make up at least one surrogate piece 162, as seen in FIG. 13, are used to accommodate the composition of metallic pieces 150 and 152 respectively which have divergent hardness and melting temperatures such as copper and aluminum. On other occasions surrogate piece 162 may be of singular composition to accommodate composition of material of metallic pieces 150 and 152 that are more similar in melting and hardness characteristics such as steel and copper.

At least one surrogate piece 162 is interposed between two metallic pieces 150 and 152 of different parent metals 154 and 156 and axial or longitudinal force is applied to provide a compressive force between metallic pieces 150 and 152 onto at least surrogate piece 162. As described above in the arcless and limited arcing processes, the relative movement with controlled pattern of movement is applied between at least one surrogate piece 162 and metallic pieces 150 and 152 and an electrical current is passed through metallic pieces 150 and 152 and through surrogate piece 162 elevating the temperature of surfaces 52 and 54 of metallic pieces 150 and 152 respectively to optimal thermal-fusion temperatures or other final temperature requirements, that will be discussed below, for each individual metallic piece 150 and 152. The relative movement transfers heat uniformally across surfaces 52 and 54 with the repositioning of metallic contacts 104 as discussed herein for arcless process. It is also desired not to have opposing edges of metallic pieces to override the edges of at least one surrogate 162 to cause the exposure of faces 52 and 54 to the ambient atmosphere. It is also desirable that surrogate 162 motion be upright and in small orbits to minimize the exposure of surrogate 162 heated area of its surface to oxygen of the surrounding air which can either attack surrogate 162 or be carried into the process film in the form of tertiary chemical compounds that would further attack the heating surfaces 150 and 152.

Again, the relative movement is imparted utilizing the same controller 110 as discussed above and utilizing very much the same set up of horizontal and vertical actuators. Typically, the actual movement is applied to at least one electrically conductive surrogate piece 162 while holding metallic pieces 150 and 152 in stationary position. However, it is contemplated that metallic pieces 150 and 152 will have actual movement and at least one surrogate piece 162 is held stationary. The former approach is discussed below in more detail, however, simply duplicating controllers 110 to operate horizontal and vertical actuators that would move metallic pieces 150 and 152 while clamps held surrogate piece 162 in stationary position would accomplish the latter approach. Furthermore, since two different parent metals 154 and 156 have different optimal thermal-fusion temperatures, different electric heating circuits are needed that may start at different times and proceed for different durations to help cause simultaneous readiness of metallic pieces 150 and 152 for thermal-fusion welding. This electrical heating circuit will be discussed in more detail below. Additionally, different longitudinal or axial forces may be needed with the different parent metals 154 and 156 and this will be discussed in more detail below.

Various surrogate piece 162 arrangements can be used depending on the parent metals 154 and 156 involved in metallic pieces 150 and 152 respectively. Surrogate 162 must be of a higher melting temperature than that of the metallic piece with which it is engaged and kept cooled if working at a process temperature close to its melting temperature. Moreover, surrogate 162 must not form lower melting temperature alloys when it is in contact with the melting welding metal. In some instances such as parent metals 154 and 156 of copper and carbon steel a single component surrogate piece composed of tungsten could be used. The shape and orbit of the relative movement and frequency could be the same, as well as the axial or longitudinal force applied and a single orbit drive system may be used to impart relative movement to this surrogate piece 162. This single orbit drive system would be very much the same as the controller 110 and horizontal and vertical actuators that imparted the relative movement to metallic piece 18 but here would impart movement to surrogate piece 162.

On the other hand, two components 170 and 172 of surrogate piece 162 is needed for parent metals 154 and 156, for example parent metals 154 and 156 of copper and aluminum would utilize tungsten and graphitic carbon respectively to be components 170 and 172 to be in contact with these parent metals 154 and 156 respectively. The two components can be moved with the same orbits and frequencies utilizing controller 110 with corresponding horizontal and vertical actuators. These components 170 and 172 may be joined by welding or held in a common frame, keeping in mind that components 170 and 172 must conduct electrical current between them. The two components can be moved in different orbits and frequencies utilizing separate orbit driving systems with multiple controllers 110 and sets of horizontal and vertical actuators and a linear bearing could be used to permit the independent movement between the two components 170 and 172 and at the same time permit axial or longitudinal force transmission and electrical conduction.

As will be discussed in more detail below, will be a specific application of the process for two different parent metals 154 and 156 of copper and carbon steel respectively. These two metals are generally not weld joined together because their heated surface oxides prevent intermingling of the parent metals at fusion and they are not prone to establish planes of varying alloys that represent a progressive transition from one parent metal to the other over an axial distance. Direct heating of the carbon steel and copper in the direct contact orbit process is prone to melt the copper away before the carbon steel face is at an alloying and welding temperature. The carbon steel heating time is longer and the heating rate must be slower to prevent quenching via deeper heat deposit than for the copper. The copper heat transfer rate is higher than the carbon steel rate and the copper must be heated quickly to preserve the welding temperature within the heating face material. Surrogate piece 162 having a single component of tungsten is utilized.

Figure 21A:
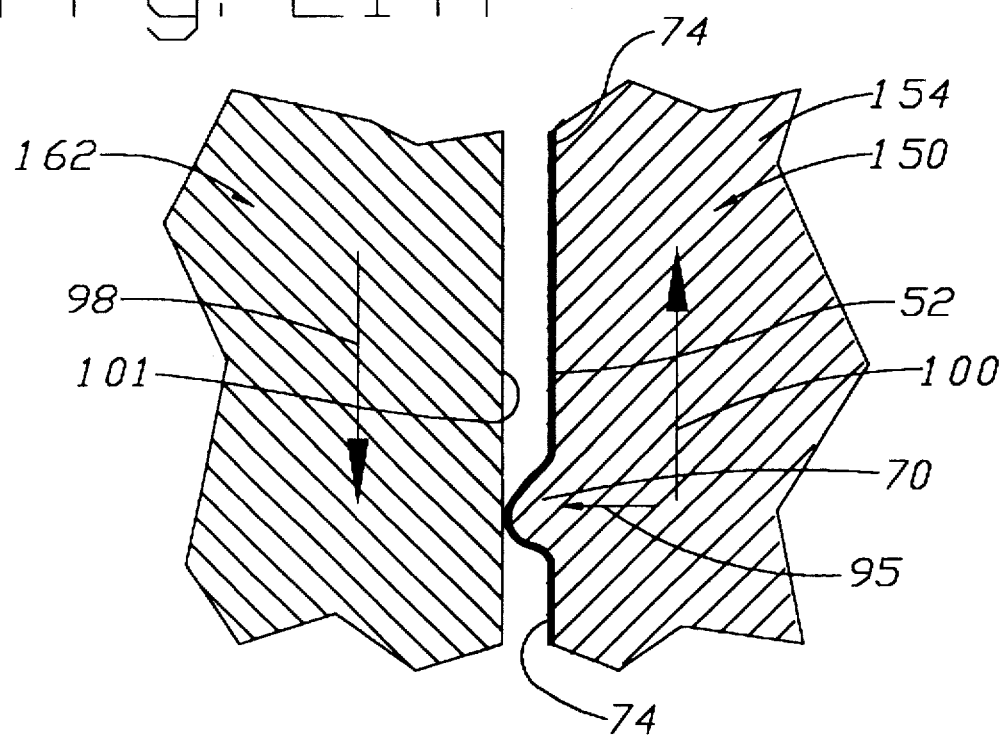
FIG. 21A is a first view in a series of two views of a prominence of a surface ablating on an electrically conductive surrogate piece in another embodiment.
Figure 21B:
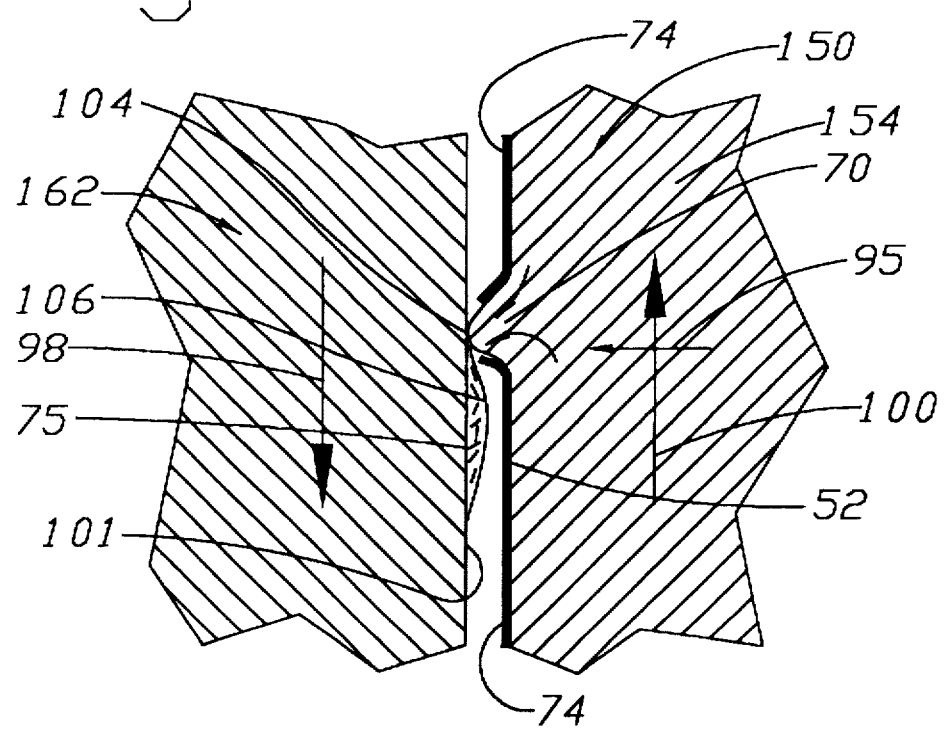
FIG. 21B is a second view in a series of two views of a prominence extruding parent metal from the ablated prominence in another embodiment.

Metallic pieces 150 and 152 have surfaces 52 and 54 respectively that extend transverse to longitudinal axes 22 and 24 of each metallic piece 150 and 152 respectively. Each surface 52 and 54 has plurality of prominences 70 positioned thereon and surfaces 52 and 54 and prominences 70 have oxide of parent metal 74 in turn positioned thereon, as seen in FIGS. 21A and 21B.

Referring to FIG. 6, in step 146 metallic pieces 150 and 152 are secured within machine 10. First, metallic piece 150 is clamped with clamps 26 and 28 into head portion 14 and similarly second metallic piece 152 is clamped into head portion 16 with clamps 30 and 32. Head portion 14 is restricted from movement relative to support platform 12 in a direction of longitudinal axes 22 and 24 of metallic pieces 150 and 152 respectively with buttresses 34 and 36. For the present example, metallic piece 150 will be restricted from movement transverse to longitudinal axis 22 and across platform 12 with opposing forces being applied with horizontal actuators 56 as seen in FIGS. 6 and 7. With regard to head portion 16, head portion 16 is permitted to move only in the direction of longitudinal axes 22 and 24, with typically the assistance of electrically insulated bearings and not in a direction transverse to longitudinal axes 22 and 24. As shown in FIG. 8, head portion 16 rides within track 17 in a direction along longitudinal axes 22 and 24. Vertical securement of metallic pieces 150 and 152 within head portions 14 and 16 respectively is provided with clamps 38 and 40 respectively.

Electrical power lead conductors 42 and 44, as shown in FIGS. 7–9 and 13, link metallic pieces 150 and 152 respectively to transformers 43 and 45 respectively with electrical connectors 46 and 48 providing electrical contact with metallic pieces 150 and 152. It is preferable that lead conductors 42 and 44 are flexible to accommodate movements and any vibrations that may occur during operation. Transformers 43 and 45 are typically wound and are able to decrease voltage from power source capable of providing 75 to 400 kilowatts of single phase alternating current at from 3 to 13 volts for example. The completion of this circuit includes lead conductors 158 and 160 as seen in FIGS. 9, 10 and 13, which connect transformers 43 and 45 respectively to at least one electrically conductive surrogate piece 162, which will be discussed in more detail below. When at least one electrically conductive surrogate piece 162 and metallic pieces 150 and 152 are brought into contact with each other the circuit is closed.

Lead conductors 158 and 160 are also preferably flexible and additionally collapsible to accommodate the retraction and insertion of surrogate 162 in and out of working position, as shown in FIGS. 9 and 10. Furthermore conductors 158 and 160 are secured to at least one surrogate piece 162 with electrical connectors 164 and 166.

In referring to FIG. 13, transformers 43 and 45 are set up to be able to perform independently in putting out different voltages. Transformers 43 and 45 are wound and have the capabilities of as discussed earlier for the arcless and limited arcing processes. Likewise power source 174 has the same capabilities as that discussed earlier. Transformer 43 would be capable of decreasing the voltage output of power source 174 to for example 3 to 13 volts. The voltage output of transformer can be varied with voltage tapping points 176. Transformer 43 is connected to a common pole of surrogate 162 with lead conductor 158 and is connected to metallic piece 150 with lead connector 42. Transformer 45 is connected to power source 174 with switches 178 or 180. With switch 178 closed, you will have the same polarity in transformer 45 as that of other transformer 43 and if switch 178 is open and switch 180 is closed the polarity of transformer 45 is reversed of that of transformer 43. Likewise, transformer 45 is connected to metallic piece 152 with conductor lead 44 and is connected to common pole surrogate 162 with conductor lead 160. Transformer 45 voltage output can be also varied with voltage tapping points 182. Thus, different voltages can be applied across each of metallic piece 150 and 152 to accommodate different parent metals need for energy investment in attaining desired thermal levels to thermally fuse weld metallic pieces 150 and 152 together. As will be discussed below, the removal of surrogate 162 and forging metallic pieces 150 and 152 together closes a circuit in which a remote junction now becomes a simple electric junction and the current of each transformer 43 and 45 adds to the other in series. Thus, the voltages will be additive at that time and the heating circuit will thereby be enhanced at that moment. There are three resulting voltages possible as follows: with switches 178 closed and 180 open, it will be transformer 43 plus 45; with switches 180 closed and 178 open, it will be transformer 43 minus 45; and with both switches 178 and 180 open it will be transformer 43 alone.

In the present discussion, with copper and carbon steel being metallic pieces 150 and 152, surrogate piece 162 will be of one component of tungsten. Thus, conductor leads 158 and 160 connect to single component surrogate piece 162 of tungsten through electrical connectors 164 and 166 respectively.

The next step 148 in this interstitial process includes step 148 in which metallic pieces 150 and 152, copper and carbon steel respectively, are aligned generally longitudinally and having surfaces 52 and 54 spaced apart forming a gap between surfaces 52 and 54. Where perimeters 53 and 55 as seen in FIG. 16A, are of the same size and shape surfaces 52 and 54 of pieces 150 and 152 they will likely be aligned in upright perimeter register. Keep in mind that the shape of metallic pieces 150 and 152 can vary widely and surface 52 may be a broad plane and surface 54 may be any smaller shape and perimeter. This position or other desired overlying position of pieces 150 and 152 is registered for purposes of aligning metallic pieces 150 and 152 into welding positions when metallic pieces are ready to forge weld them together, step 148 at FIG. 18 is now complete.

With now pieces 150 and 152 secured and electrically hooked up and transaxially aligned and a gap is formed between them, the next step 151 entails inserting electrically conductive surrogate 162 as seen in FIGS. 9 and 10 where retraction/insertion actuator 182 extended in FIG. 9 has surrogate 162 in a retracted position with surrogate 162 supported by movable sub-carriage 186 positioned on bearings in channel 188, as seen in FIG. 11. In the present discussion surrogate 162 is a single unit of tungsten. Retracting actuator 182, as seen in FIGS. 10 and 12, moves surrogate piece 162 into working position into the gap between metallic pieces 150 and 152.

In the present discussion, tungsten is used for the composition of surrogate 162 which will not be damaged by the abrasive process of this interstitial welding process being rubbed against copper and carbon steel. Surrogate 162 exerts an ablative process on surfaces 52 and 54 is an arcless process described more fully below.

With surrogate 162 in working position, as seen in FIGS. 10 and 12, the next step 153 of the interstitial process of FIG. 18, is to apply an axial or longitudinal force with the utilization of actuators 68 to metallic pieces 150 and 152 with surrogate 162 positioned therebetween. This axial force as indicated by arrows 95 in FIGS. 21A and 21B, provides a compressive force of prominences 70 against surrogate 162. As the relative movement is imparted, as indicated by arrows 98 and 100, such provides for the commencement of frictional ablation of an arcless process. Referring to FIGS. 15A and 15B, relative movement is imparted to surrogate 162 similarly as relative movement was imparted to metallic piece 18 by controller 110 as earlier described. In FIG. 15A, surrogate piece 162 is moved in the horizontal direction with screw actuator 185 and in the vertical direction with screw actuator 187 and correspondingly positions in horizontal and vertical directions are tracked by linear transducers 189 and 191. These actuators 185 and 187 are controlled by controller 110 in the same manner as were actuators 56 and 58 described above.

In this discussion of copper and carbon steel, and for numerous other metal and metal alloy compositions of metallic pieces 150 and 152, this force will be in the beginning of the process 1000 pounds per square inch which will be diminished during the process to 50 pounds per square inch by the completion of heating process and with soft metals the ending foas little as as little as 5 pounds per square inch. It is important to point out that the axial or longitudinal force will need to be different for each metallic piece 150 and 152 and their different parent metal 154 and 156 where the relative softness of the material is different. This can be accommodated with surrogate 162 secured to sub-carriage 186 with vertically guiding member 190, as seen in FIGS. 11, 15A and 15B. Vertically guiding member 190 which prevents surrogate 162 from pivoting thereon and be adjusted to a desired elevation. In turn, sub-carriage 186 can be moved in a limited longitudinal distance as shown with gaps 192 in track or channel 188. Longitudinal surrogate actuator 194 is fixedly secured to platform 12 as seen in FIG. 6. Extending or retracting longitudinal surrogate actuator 194 moves retraction/insertion actuator 182 along track or channel 196 to which actuator 182 is movably mounted thereto. Moving actuator 182 longitudinally, likewise moves sub-carriage 186 with connector arm 198 longitudinally in channel 188 and in turn surrogate piece 162 is moved with the force of actuator 182 in the same directions. This moveability of surrogate 162 in the longitudinal direction permits the operator to reduce the longitudinal force of longitudinal actuator 68 on one metallic piece and increase it on the other when different longitudinal forces are required or actuator 182 may be operated to provide no longitudinal force to allow the whole force of actuator 68 to act on surfaces 150 and 152 and surrogate 162 surfaces.

The next step is to impart relative movement as described above for the arcless and limited arc processes. In this discussion, surrogate 162 will be actually moved while metallic pieces 150 and 152 will be held transversely stationary thereby permitting the relative movement. Controller 110 as discussed earlier can apply the above discussed relative movement to surrogate 162 by controlling surrogate horizontal actuator 200 and surrogate vertical actuator 202, as seen in FIGS. 9–12. In the present discussion the frequency will be approximately 52 orbital paths per minute and should an orbital circular motion be used it will have a diameter of 0.32 inches to cause approximately 0.80 inches of path travel per second. This relative movement which was discussed earlier in more detail, in conjunction with the axial or longitudinal force will impart frictional ablation involving oxide of parent metal rubbing against surface 101 of surrogate 162 removing portions of oxide of parent metal 75, as seen in FIG. 21B. Similarly, this ablation shown in FIGS. 21A and 21B is taking place with plurality of prominences 70 on other surface 54.

The next step 157 as set forth in FIG. 18 in this interstitial welding process includes applying electric current through metallic pieces 152 and 154 and surrogate 162. As was discussed in detail above, the electrical hook up provides electrical resistant heating at surfaces 52 and 54. The power application for investment of energy into the carbon steel of 13 kilowatts per square inch of surface area and is applied for 70 seconds. The same power of 13 kilowatts per square inch is applied to the copper for 45 seconds. The rate is applied with the simultaneous completion. The current through metallic pieces 150 and 152 and surrogate 162 will be between 30,000 and 60,000 amps. For purposes of this electric resistance heating, surface 52 will be referred to in FIGS. 21A and 21B and it is understood that the similar process in occurring at surface 54 of the other metallic piece. Electric resistance heating is created at surface 52 with prominences 70, once ablated, are in metallic contact at location 104 with surrogate 162 with its electrically conductive surface and at multiple locations across surface 52. The electrical current passes through surrogate 162 which is electrically conductive and the relative movement provides relocating of the metallic conductive resistant electrical paths through which metallic conduction and conductive path heating is generated causing the elevation of the temperature of surface 52 relatively higher than that of the parent metal within metallic piece 150 integrally connected to and spaced apart from surface 52 providing an increased current resistivity generating heating at surface 52 melting parent metal underlying oxide of parent metal 74 in which melting continues forming film 106 of parent metal carrying oxide of parent metal 75 on surface 52. This film 106 is moved about surface 52 by the relative movement.

The next step 159 in FIG. 18, includes continuing the process until optimal thermal-fusion temperature is obtained by metallic pieces 150 and 152. As mentioned earlier, metals and their alloys have known melting temperature and optimal thermal-fusion temperature. Once again, this temperature is usually indirectly measured by the total investment of electrical energy imparted to metallic pieces 150 and 152. In the present discussion, copper and carbon steel will need the energy investment as set forth above. It should be understood that the temperatures for the fusion conditions can be dramatically spaced apart. One metallic piece may have a small value for total energy investment and the other metallic piece may have a high total energy investment requirement for thermal-fusion temperature to be obtained. As a result, it would be desirable to have metallic piece with the lower energy investment requirements reach a temperature or energy investment just below or at its thermal-fusion temperature being a required temperature and the other metallic piece of higher energy demand be placed at its optimal-thermal fusion temperature and forge the two together. The energy or heat of the higher energy level metallic piece will conduct to the lower energy level metallic piece and raise the energy investment level in the latter piece and convert the same to be energy of latent heat of transformation of that metallic piece thereby having both metallic pieces at their optimal energy and temperature level of thermal-fusion at time of forging. The heat investment likewise of each metallic piece must be sufficient to prevent heat transfer from the welding surfaces to the metallic piece bodies to allow the resolidification of the molten faces prior to the satisfactory melting of the lower meting temperature face.

The next step 161 in this interstitial welding process includes cease applying force to at least one surrogate 162 in a direction transverse to longitudinal axes 22 and 24 discontinuing the relative movement between surfaces 52 and 54 with at least one surrogate 162. The relative movement and continued melting of parent metal has moved oxide of parent metal 74 which has been removed from prominences 70 and surfaces 52 and 54 and contained in film 106 substantially to outside of perimeter 53 and 55 of surfaces 52 and 54 forming fin 108. With oxide of parent metal positioned outside of perimeter 53 and 55, film 106 containing substantially parent metal is positioned on surfaces 52 and 54. During this operation, similarly film 106 forms between surfaces 52 and 54 and their respective at least one surrogate piece 162 surface. Likewise, this interstitial process follows the arcless process discussed earlier where the thinning and thickening of film 106 is counteracted with axial force thereby countering the voltage available at surfaces 52 and 54 versus that in the metallic piece bodies 150 and 152 with resistive force, as discussed earlier, to the relative movement an indicator as to the surface temperature of the process.

The next step 163 of interstitial process set forth in FIG. 18 includes encapsulating and surrounding surfaces 52 and 54 with inert gas such as carbon dioxide for the copper and carbon steel welding. A number of well known inert gases are available. The gas should not be interactive with the heated surfaces 52 and 54 or it must be beneficial to the final chemistry of the exposed faces. Inert gas can be contained and dispensed from canister 204 as shown in FIGS. 6,9 and 10. In the present discussion the electric current can be shut off.

The next step 165 of interstitial process set forth in FIG. 18 includes quickly removing at least one surrogate 162 from between surfaces 52 and 54 as discussed earlier with actuator 182. Following the removal of surrogate piece 162, is the next step 167 of application of axial or longitudinal force with actuators 68 forging metallic pieces 150 and 152 together. This application of force is performed quickly thereby not leaving much time of surfaces 52 and 54 exposed to the inert gas or allowing loss of heat to bodies 150 and 152 or to the ambient surroundings. The force for the copper and carbon steel will be approximately 9000 pounds per square inch. The electric current is then resumed for further electric resistance heating as the metallic pieces are forged together. The forging force at the ploane of welding for other metals will not exceed the welding temperature compressive yield strength of the body of the weaker metal at the plane of welding. The electric current can in this instance be turned off quickly after forging such as within a second to avoid needless heating. The forged position is held for step 169 for approximately 10 seconds. With the early strength of the weld now attained, the final step 171 is to release metallic pieces 150 and 152 as a welded singular piece.

In the welding process including copper and aluminum, the less than fully molten aluminum surface is melted as it receives melting heat from the molten hotter copper. This causes a melted alloying mixed film separating the cooler and solid welding piece bodies. The sustained electrical heating of the series electrical heating circuit activates the two different metals to be in molecular motion beyond their thermal motion to promote mixing and spacial arrangement. The sustained axial force hydraulically extrudes the molten metals at the interface and brings the solid strong welding piece bodies into close position, as well as mechanically causing the remnant solid structures of each body face to invasively pass into the liquid filled voids between the remnant structures of the opposing surface. The electrical heating current is turned off when the molecular activation is unneeded and further heating would cause unwanted temperature developments, or would cause no improvement in the cooled joint, which is about one second after the rapid forward motion of forging has occurred.

Since this interstitial process involves an arcless process, as described earlier, the relative movement provides distribution of elevating temperature substantially evenly across surfaces 52 and 54 by the transverse motion of film 106 and the constant relocation of electric current contact paths by the relative motion providing a substantially even melting of the parent metals of metallic pieces 150 and 152. Moreover, the relative movement provides for isothermal planes to form within metallic bodies 150 and 152 in which these planes are substantially perpendicular to longitudinal axes 22 and 24. The even heating provides a desired alignment of surfaces 52 and 54 for forging and provides substantially uniform opposing resistant force strength at surfaces 52 and 54 inhibiting warping and residual internal stress with the weld with corresponding uniformity in cooling and longitudinal contraction of the parent metal of metallic pieces 150 and 152.

As discussed earlier, where one of the parent metals of metallic pieces has a higher melting temperature than the other, film 106 that has developed on surface 150 of the higher temperature material will cause further melting on the lower melting temperature material of surface 54 providing additional film 106 to develop on the other metallic piece surface 54 when placed in contact with one another.

Figure 24A:
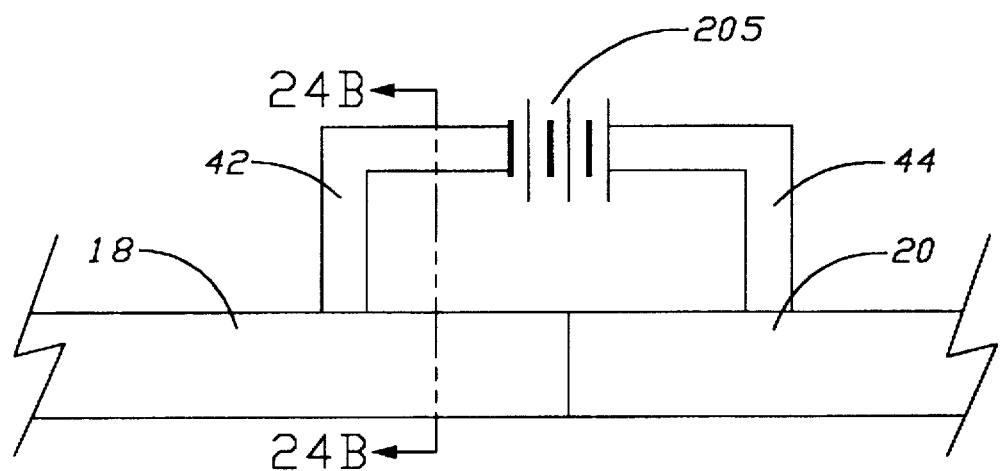
FIG. 24A is a schematic drawing of the power source and electrical connection to metallic pieces to be welded.
Figure 24B:
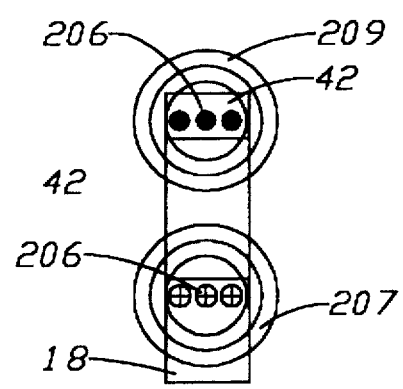
FIG. 24B is a cross section along line A—A in FIG. 24A.

Another aspect of the present invention is to achieve transversely uniform body heating by redistributing the flow of current across surfaces 52 and 54 that would normally be concentrated and imbalanced flowing within and along rails 18 and 20 biased toward the location of the connectors to metallic pieces 18 and 20 as the current uses the path of least resistance which is most often the shortest physical path. In referring to FIGS. 24A and 24B, power source 205 is connected, for example, to metallic pieces 18 and 20 by electrical conductors 42 and 44. Current flow 206, as shown in FIG. 24B is imbalanced and indicates the concentration of current flow by circle 206 with its proximity to connector 42. This imbalanced flow would be counterproductive and undesirable in above described welding processes which are operating in part to provide even heating across surfaces 52 and 54.

Figure 25A:
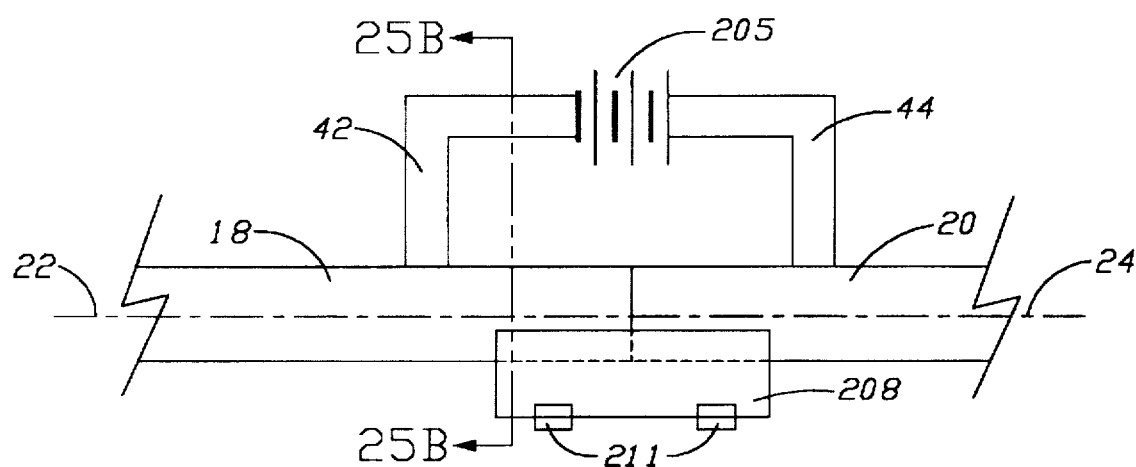
FIG. 25A is a schematic drawing of the power source and electrical connection to metallic pieces to be welded with magnetically permeable members influencing current flow in metallic pieces.
Figure 25B:
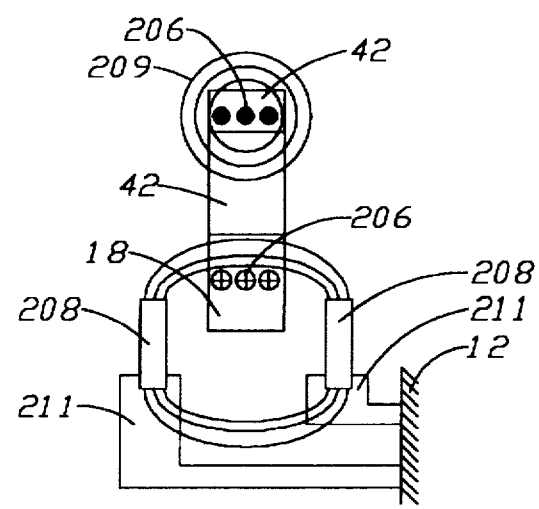
FIG. 25B is a schematic drawing of the cross section along line B—B in FIG. 25A

Induced magnetic fields 207 and 209 of current 206 are shown as circles in FIG. 24B. To counter this imbalance, highly magnetically permeable members 208, as shown in FIG. 25B, constructed of iron, are secured in a position outside and spaced apart from perimeters 53 and 55 of surfaces 52 and 54 of metallic pieces 18 and 20. As shown in FIG. 25B, members 208 are positioned toward one side of metallic pieces 18 and 20 offset in the opposite direction from where connector 42 is positioned and and are positioned at top and bottom of metallic pieces 18 and 20. In FIG. 25B, connector 42 is positioned at the side of the metallic pieces 18 and 20 and members 208 are positioned on the opposite side of vertical center of rail 18 and 20 than connectors 42 and positioned one at the top and the other at the bottom of metallic pieces 18 and 20. Each magnetically permeable conductive member 208 extend spaced apart from metallic pieces 18 and 20 and along longitudinal axes 22 and 24 of metallic pieces 18 and 20 and are each positioned substantially parallel to longitudinal axes 22 an 24 of metallic pieces 18 and 20. In this position relative to electrical connection 42, permeable members 208 attract, condense, contain, channel and divert, originally induced magnetic field 207 of FIG. 24B created from electrical current 206 passing through metallic pieces 18 and. 20, to now a portion of which is uncontained induced magnetic field 213, as shown in FIG. 25B, between magnetically permeable conductive members 208 induced magnetic field 213 repels electrical current 206 passing through paths of least resistance of metallic pieces 18 and 20 re-distributing electrical current 206, as shown in FIG. 25B, passing through cross sections of each metallic piece 18 and 20 to a new path by the force of repulsion of the induced magnetic field of current 206 which is equal to the displacing force which does attempt to displace members 208 in a direction opposite to that of the produced current displacement.

Magnetically permeable conductive members 208 are secured in their respective positions with substantially electrically insulated supports 211 constructed of steel and secured to platform 12. This current path correction process is utilized with the present orbit welding because it uses nearly constant current, opposed to electric flash butt welding which can not establish or maintain its heating arcs in an area of increased inductive reactant such as the present invention does impose. Thus the present current distribution can be utilized with all of the welding processes set forth in the present invention.

At the completion of any of the above described welding processes, it is recommended that the newly welded together metallic pieces be subjected to hot work beam bending. Bending of metals in and near their temperature of crystalline phase transformation can both increase their internal strength and reduce their internal stresses at cooler service temperatures. It has been further published that the surface hardness and the toughness of the metals is increased by such bending.

The above described orbit welding machine is capable to impart the following process, whereas general machines for the welding of large area sections are not equipped with the mechanisms to provide such motion of the adequate power of such transverse motions to produce the previous benefits of such bending.

The beam bending process herein is exercised by holding metallic piece 18, as shown in FIG. 1, with clamps 26 and 28 securing metallic piece 18 within head portion 14. The newly welded surfaces 52 and 54 are positioned in and are centrally located between head portions 14 and 16 just where they would have been positioned at the completion of any of the welding processes previously discussed. Metallic piece 20 would be clamped to head portion 16 with clamp 32 positioned further away from the welds of metallic pieces 18 and 20 than clamp 30. Clamp 30 could be released to permit transverse movement. Also, vertical clamps 38 and 40 are not used. Horizontal actuators 58 proximate the welded area and vertical actuators 56 proximate the welded area are used. Controlled movement, preferable orbiting patterned movements as those described earlier are imparted by a controller 110 to impart orbiting motion to metallic piece 18 and its newly formed weld to cause the hot welded metal to bend relative to remote clamp 32.

The orbiting for high carbon steel railroad rails 18 and 20 would typically be elliptical or circular operating to cause an elongation and compression deformation of one to three percent in the longitudinal direction of those surface areas most remote to the neutral axis of the bending force for a time duration that allows substantially complete crystalline transformation.

The forces imparted by the orbiting motion include stretching, compression, and shear force deformation of parent metals in transformation.

The imparted tension stretching and compression bending forces stresses on highly stressed crystalline connections causing their release and reattachment at lower stressed junctures. Both deformations also cause adjacent crystals under differing stress deformation to deform differently, and the resultant repositioning assists internal crystalline materials to eject in the act of transformation, more nearly to the temperature of transformation, preventing such conditions as retained austenite in service temperature metals. This beam bending also imposes shear forces that overly stress highly stressed crystalline connections, resulting in disattachment and reattachment at a temperature that permits this without causing residual crystalline connection damage to the cooled metal.

The cyclical orbiting motion applied to the hot welded joint imposes the stretching, compression and shear forces to repeatedly and cyclically occur in reversing procession. The result is a more full crystalline transformation and a less stressed crystalline micro structure, where the theoretically available strength of the metal is neither consumed within small domains of force balances or employed in the thermal warpage of the piece at its cooled service application temperature. The hot orbit bending of the transforming joint provides a service part of higher geometric tolerance with higher strength characteristics at the service temperature for the mechanical support of service loads.

While the detailed description of the preferred embodiments of the invention have been given, it should be appreciated that many variations can be made thereto without departing from the scope of the invention as set forth in the appended claims.

I claim:

1. An improved welding process in which two metallic pieces each composed of a parent metal which are weld compatible with each other, in which each metallic piece extends along a longitudinal axis of each metallic piece, in which each metallic piece has a surface in which each surface has a plurality of prominence positioned thereon in which each said surfaces extend transverse to its said longitudinal axis and in which each surface has a perimeter, in which at least a portion of one surface is positioned to overlie at least a portion of the other surface and in which said one surface and said other surface including said plurality of prominence thereon having an oxide of parent metal disposed thereon, comprising the steps of:

applying a force along the longitudinal axis at least one of said one and other surfaces to abut opposing said other and one surfaces respectively between said at least a portion of said one surface and said at least a portion of said other surface;

applying a force to at least one of said two metallic pieces transverse to the longitudinal axis of said at least one of said two metallic pieces to provide a relative movement between said two metallic pieces in at least a first direction and a second direction in which said first and second directions are each transverse to said longitudinal axis of said at least one of said two metallic pieces and causing relative displacement between a cross section of each of said two metallic pieces, in which each cross section of each of said two metallic pieces is transverse to its respective longitudinal axis and relative displacement of said at least a portion of said one surface relative to at least a portion of said other surface and transverse to the longitudinal axes in which said relative movement includes a controlled pattern of movement in which the controlled pattern positions a part of said one surface and other surface in and out of contact with said other surface and one surface respectively; and applying an electrical voltage across said metallic pieces causing an electrical current to pass through said metallic pieces in which said electrical current passes from said one surface to said other surface elevating the temperatures with electric resistant heating of said one and other surfaces for thermal-fusion welding.

2. The improved welding process of claim 1 in which air gaps are formed between said one and other surfaces with said prominences on said one and other surfaces abutting opposing said other and one surfaces respectively at said at least a portion of one surface positioned to overlie said at least a portion of the other surface.

3. The improved welding process of claim 1 in which said application of force along said longitudinal axis provides a force stress in the direction of the longitudinal axis within said parent metal aligned with said at least a portion of one and other surfaces positioned to overlie one another and imparting a compressive force at said prominences on said parent metal and said oxidized parent metal disposed on said at least a portion of one and other surfaces positioned to overlie one another.

4. The improved welding process of claim 1 in which said relative movement is at substantially a constant speed by said application of force to at least one of said metallic pieces transverse to said longitudinal axis providing a required amount of irresistible force that ruptures all areas of premature fusion welding.

5. The improved welding process of claim 1 in which said application of force to at least one of said metallic pieces transverse to the longitudinal axis of at least one metallic piece in conjunction with a continued application of said application of force along said longitudinal axis imparts frictional ablation to remove portions of said oxide of parent metal at said one surface and said other surface.

6. The improved welding process of claim 5 in which said relative movement is upright between said one and other surfaces.

7. The improved welding process of claim 5 in which said controlled patterned movement is continuous for a time period imparting substantially uniform electric resistance heating across said one and other surfaces.

8. The improved welding process of claim 5 in which said one surface and other surface each have a first edge and a second diametrically opposing second edge at each said perimeter in which said first edge of said one surface is positioned closer to said first edge of said other surface than to said second diametrically opposing edge of said other surface with said one and other surfaces facing each other and substantially centrally aligned in which the controlled pattern movement prevents said first edge of said one surface and said second diametrically opposing edge of said other surface from passing over one another.

9. The improved welding process of claim 5 in which controlled pattern of movement is in the configuration of orbits.

10. The improved welding process of claim 5 in which said controlled pattern of movement is in the configuration of a predetermined pattern.

11. The improved welding process of claim 10 in which said predetermined patterns includes repeating regular patterns.

12. The improved welding process of claim 5 in which the controlled pattern of movement is in the configuration of random direction of movements.

13. The improved welding process of claim 5 in which said application of electrical voltage across said metallic pieces causing electrical current to pass through said metallic pieces provides electrical resistance heating at said one surface and said other surfaces at a location in which said frictional ablation removes said portions of said oxide of said parent metal providing multiple sites of parent metal contact between said one and other surfaces for electrical current conduction between said one and said other surfaces at said multiple sites, in which said electric resistance heating creates an increasing temperature at said one surface and said other surface relative to temperature increase of its parent metal within each respective metallic piece spaced apart from said one surface and said other surface from conduction of heat from said increasing temperature of said one and other surfaces providing an increased current resistivity further elevating the temperature at said one surface and said other surface melting said parent metal underlying said oxide of said parent metal of said metallic pieces carrying said oxide of parent metal forming a film at said one and other surfaces.

14. The improved welding process of claim 13 in which said film of said film of said parent metal carrying said oxide of parent metal increases in thickness in a direction along said longitudinal axis of said metallic pieces with said further elevating temperature from said increased electric current resistivity requiring an increase in driving voltage across said film and correspondingly providing lower available driving voltage from a source of fixed voltage through said metallic pieces, providing increasing heat deposit rate and the temperature at a location of the film at said one and other surfaces creating further melting of parent metal at said one and other surfaces and a correspondingly relative lesser elevation of temperature of said metallic bodies from increased whole circuit resistance reducing electric current conducting through said metallic bodies.

15. The improved welding process of claim 14 in which said one and another surfaces are moved toward each other thinning said thickness of said film reducing said current driving voltage across said film and increasing the current driving voltage through conducting lengths of said metallic pieces.

16. The improved welding process of claim 13 in which a decrease in a resistive force to said relative movement between said one and other surfaces relative to said force applied along said longitudinal axis indicates said further elevating temperature at said one and other surfaces.

17. The improved welding process of claim 13 in which said relative movement repositions said multiple sites of parent metal contact providing electrical conduction at said multiple sites between said one and other surfaces and transporting heat content of said film over said one and other surfaces transverse to said longitudinal axis.

18. The improved welding process of claim 13 in which said melting continues removing volume of said parent metal and oxide of parent metal disposed on said one and other surfaces from said one surface and other surface causing a plane of contact between said one and other surfaces to become substantially transverse to the longitudinal axes of each of said metallic pieces in which said volumes displace air content of air gaps formed between said plurality of prominences on said one and other surfaces abutting said other and one surface respectfully and in which said continued melting and said relative movement causes said air to purge to and volumes to extrude to the outside of said perimeters of said one and other surfaces forming a fin containing said volume until a film of substantially only said parent metal remains on and between said one surface and other said surface.

19. The improved welding process of claim 18 includes cease applying said force to said at least one metallic pieces transverse to the direction of the longitudinal axis of said at least one metallic pieces stopping relative movement between said one surface and said other surface with said one surface and other surface in a desired overlying relationship to one another with said one and other surfaces having elevated to and obtained an optimum temperature for thermal-fusion forged welding.

20. The improved welding process of claim 19 in which said one surface and other surface each have substantially the same said perimeter shape and dimension and said desired overlying relationship is said one surface in upright register with said other surface.

21. The improved welding process of claim 19 including continuing electric current passing through said two metallic pieces through and subsequent to cease applying said force to said at least one metallic pieces transverse to the direction of the longitudinal axis of said at least one metallic pieces.

22. The improved welding process of claim 21 including applying another force along said longitudinal axis of at least one of said metallic pieces, subsequent to said cease applying force, further extruding said volume of film from between said one and other surfaces to outside of said perimeter of said one and another surfaces and forge welding said one and another surfaces together continuing said electric current until said forging is complete.

23. The improved welding process of claim 21 in which said relative movement of said one and other surfaces distribute said elevating temperature substantially evenly across said one and other surfaces providing substantially even melting of said parent metal of each said two metallic pieces and forming substantially parallel isothermal planes within each of said two metallic bodies substantially perpendicular to said longitudinal axis of each of their respective said two metallic pieces and form said one and other surfaces substantially perpendicular to each said longitudinal axis of each of their respective said two metallic bodies providing a desired abutting alignment of said one and other surfaces with the alignment of said longitudinal axis of each of said two metallic pieces at the time of applying said another force advancing said two metallic pieces together for thermal-fusion forged welding said two metallic pieces together at said one and other surfaces.

24. The improved welding process of claim 1 in which said electrical current passes through said metallic pieces without an electric arc forming between said one and another surfaces.

25. The improved welding process of claim 1 in which a magnetically permeable conductive member is secured in a position outside and spaced apart from said perimeters of said one and other surfaces of said metallic pieces at one side of said metallic pieces and another magnetically permeable conductive member is secured in a position outside and spaced apart from said perimeters of said one and other surfaces of said metallic pieces on an another side, opposite said one side, of said metallic pieces in which said magnetically permeable conductive member and said another magnetically conductive member each extend spaced apart from said metallic pieces and along said longitudinal axes of said two metallic pieces attracting, condensing, containing, channeling and diverting an induced magnetic field created from said electrical current passing through said two metallic pieces in which a portion of uncontained induced magnetic field between said one and another magnetically permeable conductive members of said induced magnetic field repels said electrical current passing through paths of least resistance of said two metallic pieces redistributing said electrical current passing through a cross section of each said two metallic pieces to a new path.

26. The improved welding process of claim 25 in which said magnetically permeable conductive member and said another magnetically permeable conductive member are each positioned substantially parallel to the longitudinal axis of said two metallic pieces.

27. The improved welding process of claim 25 in which said magnetically permeable conductive member and said another magnetically permeable conductive member are secured in said position with substantially electrically insulated supports.

28. The improved welding process of claim 1 in which said plurality of prominences being constructed of said parent metal and coated with said oxidized parent metal positioned thereon and in which said parent metal underlying a coating of said oxide of parent metal at said one and other surfaces is predisposed to exothermically develop oxidized parent metal coatings at said one and other surfaces in the presence of elevated temperatures and exposure to air.

29. The improved welding process of claim 28 in which said application of force along said longitudinal axis is removed prior to applying said force to at least one of the metallic pieces to provide said relative movement.

30. The improved welding process of claim 29 includes a prominence heating cycle which includes a step of imparting said relative movement causing at least one of said plurality of prominences on said one surface and at least another of said plurality of prominences on said other surface to collide with each other traveling in a direction transverse to said longitudinal axis shattering said oxidized parent metal coating of each said at least one of said plurality of prominences and said at least another of said plurality of prominences removing an interfering portion of each said at least one of said plurality of prominences and said at least another of said plurality of prominences reducing the elevation of each said prominences relative to their respective surface in which each of said prominences is positioned thereon in which air gaps are formed between said one and other surfaces with uncollided prominences and prominences with said reduced elevation positioned thereon and spacing apart said one and other surfaces and placing said parent metal of each of said prominences in cohesive and electrically conductive contact with one another providing said electric resistant heating.

31. The improved welding process of claim 30 includes said prominence heating cycle which includes a step of at least a portion of said electrical current passing through said parent metal of each of said at least one of said plurality of prominences and said at least another of said plurality of prominences in said contact with each other providing said electric resistant heating and elevating the temperature of said parent metal in each said prominences and axially and radially supporting substrata of parent metal of each said prominences thermally expanding said parent metal of said substrata and said parent metal in each said prominences extruding said parent metal of said substrata and each said prominences axially in a pliable state from each said prominences into said air gaps.

32. The improved welding process of claim 31 includes said prominence heating cycle which includes a step in which a portion of said pliable extruded parent metal at said elevating temperature exothermically forms in said air gaps an oxide of parent metal outside of each said prominences elevating the temperature from said exothermic formation along said one and another surfaces with said relative movement moving said portion of extruded pliable parent metal transverse to said longitudinal axis.

33. The improved welding process of claim 32 includes said prominence and heating cycle which includes a step in which said portion of parent metal extruded into said air gaps from each said prominences continues to extrude and said portion of parent metal is transported by said relative movement to overlie said one and other surfaces including said adjacent supporting substrata of said prominences in conjunction with said elevating temperature of said adjacent supporting substrata causing thermal expansion of said adjacent supporting substrata of said parent metal and by thermal expansion elevating further prominences on said one surface and other surfaces to a height sufficient to collide with yet other uncollided prominences positioned on an opposing surface of said further prominences on said one and other surfaces.

34. The improved welding process of claim 33 includes said prominence heating cycle which includes a step in which said substrata parent metal of each said prominences which extruded parent metal therefrom and from which heat was conducted to adjacent substrata thermally contract and axially lower the elevation of each said prominences.

35. The improved welding process of claim 34 includes said prominence heating cycle which includes a step in which said relative movement causes another portion of said pliable parent metal extruded from each said prominences to move transverse to said longitudinal axes across said one and another surfaces remaining in contact with each other with a cohesive formation of elongated bodies of parent metal from each said prominences along said one and another surfaces respectively elevating the temperature of said parent metal with said electrical current continuing to pass through said parent metal providing said electrical resistant heating as the elongated bodies continue to elongate from said relative movement.

36. The improved welding process of claim 35 includes said prominence heating cycle which includes a step in which said elongated bodies continue to elongate until said contact of parent metal breaks and an electric arc forms between elongated bodies of said parent metal from each said prominences in an atmosphere which includes ionized vapor of parent metal formed from said elevating temperature of said parent metal until a means for extinguishing the arc extinguishes the same.

37. The improved welding process of claim 36 in which said means for extinguishing the arc includes a separate parent metal contact between said one and other surfaces of lesser electrical resistance than the electrical resistance experienced by said arc, in proximity to said arc, providing a more desirable path for the electrical current passing through the arc and diverting the electrical current through said separate parent metal contact.

38. The improved welding process of claim 36 in which said means for extinguishing the arc includes at least one end attachment point of the arc moving along a path on a surface of said parent metal of the elongating bodies of extruded parent metal and blocked from further travel by engaging intervening electrically insulative oxide of parent metal.

39. The improved welding process of claim 36 in which said relative movement imparted through said prominence heating cycle provides necessary movement of said one and other surfaces to have a simultaneous existence of a multiplicity of other said prominence and heating cycles in different stages of maturation of said prominence and heating cycle across said portions of said one and other surfaces which overlie one another.

40. The improved welding process of claim 36 in which said elevated temperature of said substrata of said at least one prominence and another prominence elevates the temperature axially and radially of adjoining substrata causing parent metal in said adjoining substrata to expand and elevate a portion of said one and another surfaces adjacent to said at least one and another prominences to form a new prominence adjacent to each of said prominence and another prominence of sufficient height for said new adjacent prominences to collide with further prominences positioned on opposing surfaces of said one and other surfaces.

41. The improved welding process of claim 40 in which said electric resistance heating and said arc elevates the temperature of said parent metal of said prominence and said other prominence causing a change of state of said at least a portion of said another portion of said parent metal which has extruded from said prominence and other prominence to pressurized gaseous bubble inclusions between said one and other surfaces which in venting form spatter.

42. The improved welding process of claim 41 in which said one and other surfaces overlying one another in narrow separation to one another of less than the height of tallest prominence or other prominence substantially cohesively trap said spatter onto said one and other surfaces contributing to said elevation of said new prominences.

43. The improved welding process of claim 1 includes removing a substantial portion of said oxidized parent metal from between said one surface and said other surface in which said oxidized parent metal elevating in temperature in the presence of said electric current passing through said parent metal and said electric arc provides localized heating until said oxidized parent metal endothermically disassociates gaseous oxygen therefrom creating heated parent metal and oxygen with the absorption of said localized heating.

44. The improved welding process of claim 43 in which the partial pressure of parent metal vapor forces portions of said gaseous oxygen from between said one and another surfaces.

45. The improved welding process of claim 43 including cease applying said force to said at least one metallic pieces transverse to the direction of the longitudinal axis of said at least one metallic pieces stopping relative movement between said one surface and other surface with said one surface and said other surface in a desired overlying relationship to one another and forging said two metallic pieces together with said one and other surfaces having obtained an optimum temperature for thermal-fusion forged welding.

46. The improved welding process of claim 45 in which said forged welding includes applying another force along the longitudinal axis advancing said one and another surfaces toward one another fusing said one and other surfaces and forcefully extruding said oxidized parent metal to outside of the one and another surfaces.

47. The improved welding process of claim 45 in which said one surface and other surface each have substantially the same perimeter shape and dimension and said desired overlying relationship is said one surface in upright register with said other surface.

48. The improved welding process of claim 28 in which said relative movement between said one and other surfaces includes a controlled patterned of movement in which the controlled pattern positions a part of said one surface and other surface in and out of contact with said other surface and one surface respectively in which the positions of said plurality of prominences of each said one and other surfaces provide collisions with a plurality of opposing prominences of each said other and one surfaces respectively in a transverse direction to said longitudinal axes.

49. The improved welding process of claim 48 in which said controlled patterned movement is continuous.

50. The improved welding process of claim 48 in which the said one surface and other surface each have a first edge and a second diametrically opposing second edge in which said first edge of said one surface is positioned closer to said first edge of said other surface than to said second diametrically opposing edge of said other surface with said one and other surfaces are facing each other and substantially centrally aligned in which the controlled pattern movement prevents said first edge of said one surface and said second diametrically opposing edge of said other surface from passing over one another.

51. The improved welding process of claim 50 in which controlled pattern of movement is in the configuration of orbits.

52. The improved welding process of claim 50 in which the controlled pattern of movement is in the configuration of a predetermined pattern.

53. The improved welding process of claim 52 in which said predetermined pattern includes repeating regular patterns.

54. The improved welding process of claim 48 in which the controlled pattern of movement is in the configuration of random direction of movements.

55. The improved welding process of claim 48 in which the relative movement is at a constant speed provided by said application of said force to at least one of the metallic pieces to provide said relative movement in a required amount of irresistible force that ruptures all areas of premature fusion welding.

56. The improved welding process of claim 1 in which said relative movement of said one and other surfaces distribute said elevating temperature substantially evenly across said one and other surfaces providing substantially an even melting of said parent metal of each said two metallic pieces and forming parallel isothermal planes within each of said two metallic bodies substantially perpendicular to said longitudinal axis of each of their respective said two metallic pieces and form said one and other surfaces substantially perpendicular to each said longitudinal axis of each of their respective said two metallic bodies providing a desired abutting alignment of said one and other surfaces with said one and other surfaces in a desired overlying relationship being the alignment of said longitudinal axis of each of said two metallic pieces at the time of a thermal-fusion forge welding of said two metallic pieces together at said one and other surfaces.

57. An improved welding process in which two metallic pieces each composed of a different parent metal which are incompatible during heating, in which each metallic piece extends along a longitudinal axis of each metallic piece, in which one metallic piece has a one surface extending transverse to its said longitudinal axis and the other metallic piece has an other surface transverse to its longitudinal axis, in which each surface has a plurality of prominences positioned thereon and in which said one surface and said other surface and said plurality of prominences each has an oxidized parent metal positioned thereon, comprising the steps of:

aligning said one and other surfaces of each metallic piece in an overlying relationship with each other;

positioning a gap between said one and other surfaces of said two metallic pieces and positioning at least one surrogate electrically conductive piece in said gap;

applying a force along the longitudinal axis of each of said two metallic pieces to provide a compressive force between said prominences of said one and other surfaces with said at least one surrogate electrically conductive piece positioned between said one and other surfaces and in contact with said prominences of said one and other surfaces;

applying a force to at least one of said at least one surrogate electrically conductive piece and said two metallic pieces transverse to the longitudinal axes of said metallic pieces to provide upright relative movement between said at least one surrogate electrically conductive piece and said one and other surfaces causing displacement of said at least one surrogate electrically conductive piece relative to said one and other surfaces and in at least a first and second directions in which each of said directions being transverse to said longitudinal axes creating frictional ablation removing said oxidized parent metal disposed on said prominences positioned on said one and other surfaces providing metallic contact between said prominences positioned on said one and other surfaces and said at least one surrogate electrically conductive piece;

applying an electrical current through said two metallic pieces and said at least one surrogate electrically conductive piece, in which electrical resistance heating is created at said one surface and said other surface with said prominences in said metallic contact at multiple locations with said at least one surrogate electrically conductive piece, in which said electrical current passes through parent metal of said prominences and through said at least one surrogate electrically conductive piece providing relocating said multiple locations through said relative movement providing metallic conductive resistance electrical paths through which metallic electrical resistance conduction and conductive path heating is generated causing the elevation of the temperature of said one and other surfaces relatively higher than that of said parent metal within each said metallic piece respectively integrally connected to and spaced apart from said one surface and said other surface, providing an increased current resistivity generating heating at said one surface and said other surface melting said parent metal underlying said oxide of parent metal positioned thereon in which said melting continues forming a film of parent metal carrying an oxide of parent metal on said one surface and other said surface respectively being moved about said one and other surface respectively with said relative movement;

cease applying said force to said at least one of said at least one surrogate electrically conductive piece and said two metallic pieces transverse to the longitudinal axes of said metallic pieces stopping relative movement between said one surface and said other surface and said at least one said surrogate electrically conductive piece with said film carrying said oxides of parent metal from said one and other surfaces substantially moved to outside a perimeter of each of said one and other surfaces with said relative movement and with displacement from said melting parent metal of said metallic pieces and leaving a film containing substantially parent metal positioned between said one and other surface;

encapsulating at least said one surface and other surface of said two metallic pieces with an inert gas; and removing of said at least one surrogate electrically conductive piece from between from said one and other surface and moving and forging said one and other surfaces together thermal-fusion forge welding said two metallic pieces together.

58. The improved welding process of claim 57 in which said aligning said one and other surfaces of each metallic piece in an overlying relationship with each other includes positioning said longitudinal axes of said two metallic pieces in alignment with each other in which subsequently said application of force is imparted to said at least one surrogate electrically conductive piece transverse to the longitudinal axes of said metallic pieces to provide relative movement between said at least one surrogate metallic piece and said one and other surfaces.

59. The improved welding process of claim 57 includes aligning said one and other surfaces of each metallic piece in an overlying relationship with each other with said longitudinal axes of said metallic pieces aligned with each other prior to moving and forging said one and other surfaces together in which said force application of force was imparted to said two metallic pieces transverse to the longitudinal axes of said metallic pieces.

60. The improved welding process of claim 57 in which said at least one surrogate electrically conductive piece has a higher melting temperature than said parent metal of said metallic body in which said at least one surrogate electrically conductive piece is in contact.

61. The improved welding process of claim 60 in which said at least one surrogate electrically conductive piece includes two surrogate electrically conductive pieces in which one of said two surrogate electrically conductive pieces contacts one said one surface and another of said two surrogate electrically conductive pieces contacts said other surface.

62. The improved welding process of claim 61 in which each of said two surrogate electrically conductive pieces are constructed of different materials.

63. The improved welding process of claim 57 in which the relative movement is upright between said at least one of said one and other surfaces and said at least one surrogate electrically conductive piece and includes a controlled pattern of movement in which the controlled pattern positions at least a portion of said one surface and other surface in and out of contact with said at least one surrogate electrically conductive piece with said compressive force maintained.

64. The improved welding process of claim 63 in which said controlled pattern movement is continuous for a time period for transferring substantially uniform heating across said one and other surfaces.

65. The improved welding process of claim 63 in which the said one surface and other surface face each other and are positioned on opposing sides of said at least one surrogate electrically conductive piece in which said at least one surrogate electrically conductive piece has a first edge and a diametrically opposing second edge at a perimeter of said at least one surrogate electrically conductive piece in which only one of said first and opposing second edge of said at least one surrogate electrically conductive piece is permitted to pass at a time outside of said perimeter of said one and other surfaces in which said surrogate electrically conductive piece is in contact.

66. The improved welding process of claim 63 in which controlled pattern of movement is in the configuration of orbits.

67. The improved welding process of claim 63 in which the controlled pattern of movement is in the configuration of repeating regular patterns.

68. The improved welding process of claim 63 in which the controlled pattern of movement is in the configuration of random direction of movements.

69. The improved welding process of claim 63 in which the relative movement is at a constant speed provided by irresistible force.

70. The improved welding process of claim 63 in which the relative movement between said at least one surrogate electrically conductive piece and said one surface and other surface repositioning said locations in which said ablation has removed said oxide of parent metal from said parent metal of said one and other surfaces providing repositioning of metallic contacts of said one and other surfaces with said at least one surrogate electrically conductive piece transferring heat across said one and other surfaces.

71. The improved welding process of claim 57 in which said film carrying said oxide of parent metal from said one and other surfaces substantially moved to outside a perimeter of each of said one and other surfaces with said relative movement forms a fin outside each of said one and other surfaces.

72. The improved welding process of claim 57 in which said one surface and other surface are substantially the same shape and size and are placed in register with each other with welding said two metallic pieces together.

73. The improved welding process of claim 57 in which said forging includes applying a force along the longitudinal axes of said two metallic pieces with said parent metal film of each said one and another surfaces positioned respectively thereon moving said one and other surfaces together and imparting a compressive force between said one and other surfaces.

74. The improved welding process of claim 57 in which said film of said parent metal which carries oxide of parent metal increases in thickness in a direction along said longitudinal axes of said two metallic pieces and away from said at least one surrogate electrically conductive piece with the elevation of temperature from electric current resistivity requiring an increase in driving voltage across said film and providing lower available driving voltage through said metallic pieces increasing the temperature at a location of the film creating further melting of parent metal and reducing elevation of temperature at said metallic pieces from current conducting through said metallic pieces.

75. The improved welding process of claim 74 in which said one and other surfaces are moved toward each other with said at least one surrogate electrically conductive piece positioned therebetween thinning said thickness of said film reducing said current driving voltage across said film and increasing the current driving voltage in said metallic piece in contact with said film.

76. The improved welding process of claim 57 in which ceasing application of said force to one of said at least one surrogate metallic piece and two metallic pieces transverse to said longitudinal axes of said metallic pieces is implemented with a determination of a desired temperature of said parent film on said one and other surfaces.

77. The improved welding process of claim 57 in which a decrease in a resistive force to said relative movement between said one and other surfaces indicates said further elevating temperature at said one and other surfaces.

78. The improved welding process of claim 57 in which said relative movement of said at least one surrogate electrically conductive piece to said one and other surfaces distribute said elevating temperature substantially evenly across said one and other surfaces providing substantially an even melting of said parent metal of each said two metallic pieces and forming isothermal planes within each of said two metallic pieces substantially perpendicular to said longitudinal axis of each of their respective said two metallic pieces and form said one and other surfaces substantially perpendicular to each said longitudinal axis of each of their respective said two metallic pieces providing a desired alignment of said one and other surfaces with said removal of said surrogate electrically conductive piece for thermal-fusion forged welding to form a weld of said two metallic pieces together at said one and other surfaces providing substantially uniform opposing resistant force strength at said one and other surfaces with the uniformity of the elevated temperature and inhibiting warping and residual internal stress with said weld with corresponding uniformity in cooling and contraction.

79. In the improved welding process of claim 57 includes one of said two metallic pieces of a higher melting temperature in which said film on said one surface of higher melting temperature conducts heat to said film of said other surface further melting said parent metal of said other surface forming additional film on said other surface at forging.

80. The improved welding process of claim 57 in which a magnetically permeable conductive member is secured in a position outside and spaced apart from said perimeters of said one and other surfaces of said metallic pieces at one side of said metallic pieces and another magnetically permeable conductive member is secured in a position outside and spaced apart from said perimeters of said one and other surfaces of said metallic pieces on an another side, opposite said one side, of said metallic pieces in which said magnetically permeable conductive member and said another magnetically conductive member each extend spaced apart from said metallic pieces and along said longitudinal axes of said two metallic pieces attracting, condensing, containing, channeling and diverting an induced magnetic field created from said electrical current passing through said two metallic pieces in which a portion of uncontained induced magnetic field between said one and another magnetically permeable conductive members of said induced magnetic field repels said electrical current passing through paths of least resistance of said two metallic pieces re-distributing said electrical current passing through a cross section of each said two metallic pieces to a new path.

81. The improved welding process of claim 80 in which said magnetically permeable conductive member and said another magnetically permeable conductive member are each positioned substantially parallel to the longitudinal axis of said two metallic pieces.

82. The improved welding process of claim 80 in which said magnetically permeable conductive member and said another magnetically permeable conductive member are secured in said position with substantially electrically insulated supports.

* * * * *

UNITED STATES PATENT AND TRADEMARK OFFICE
CERTIFICATE OF CORRECTION

PATENT NO.   : 5,763,850
DATED        : June 9, 1998
INVENTOR(S)  : Robert C. Hardt It is certified that error appears in the above-identified patent and that said Letters Patent is hereby corrected as shown below:

```
Col.  3, Line  3, Change "Furtherrore" to -Furthermore-.
Col.  5, Line 62, Change "A-A" to -4-4-.
Col.  5, Line 63, Change "B-B" to -5-5-.
Col.  6, Line  1, Change "E-E" to -7-7-.
Col.  6, Line  2, Change "D-D" to -8-8-.
Col.  6, Line  3, Change "C-C" to -9-9-.
Col.  6, Line  5, Change "C-C" to -9-9-.
Col.  7, Line 16, Change "A-A" to -24B-24B-.
Col.  7, Line 22, Change "B-B" to -25B-25B-.
Col. 11, Line 48, Change "ELS" to -as-.
Col. 11, Line 56, Change "arid" to -and-.
Col. 14, Line 40, Change "dsignated" to -designated-.
Col. 17, Line 35, Change "84" to -84,-.
Col. 17, Line 49, Change "surfaare" to -surfaces-.
Col. 17, Line 50, Change "constd" to -52 and-.
Col. 26, Line 19, Change "foas little as" to -force will be-.
Col. 28, Line 41, Change "ploane" to -plane-.
Col. 27, Line 61, Change "meting" to -melting-.
```

Signed and Sealed this

Sixteenth Day of March, 1999

Attest:

Attesting Officer

Q. TODD DICKINSON

Acting Commissioner of Patents and Trademarks